United States Patent
Robinson et al.

(10) Patent No.: US 9,606,821 B2
(45) Date of Patent: Mar. 28, 2017

(54) VIRTUAL ENVIRONMENT MANAGER FOR CREATING AND MANAGING VIRTUAL MACHINE ENVIRONMENTS

(75) Inventors: Scott H. Robinson, Portland, OR (US); Vijay Tewari, Portland, OR (US); Robert C. Knauerhase, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2162 days.

(21) Appl. No.: 11/541,712

(22) Filed: Sep. 29, 2006

(65) Prior Publication Data

US 2007/0089111 A1   Apr. 19, 2007

Related U.S. Application Data

(63) Continuation-in-part of application No. 11/016,656, filed on Dec. 17, 2004, now Pat. No. 7,735,081.

(51) Int. Cl.
  *G06F 9/455*   (2006.01)
  *G06F 21/53*   (2013.01)
  *H04L 29/06*   (2006.01)

(52) U.S. Cl.
  CPC ...... *G06F 9/45545* (2013.01); *G06F 9/45558* (2013.01); *G06F 21/53* (2013.01);
  (Continued)

(58) Field of Classification Search
  CPC .................................................. G06F 9/45533
  See application file for complete search history.

(56) References Cited

U.S. PATENT DOCUMENTS 5,666,523 A   9/1997   D'Souza
6,112,279 A   8/2000   Wang
(Continued)

OTHER PUBLICATIONS

"Intel Patent reveals virtual machine geared for consumer desktops", Macsimum News, Jun. 22, 2006, Internet Address: http://www.macsimumnews.com/index.php/archive/intel_patent_reveals_virtual_machine_geared_for_consumer_desktops/.
(Continued)

*Primary Examiner* — Abu Ghaffari
*Assistant Examiner* — James J Lee
(74) *Attorney, Agent, or Firm* — Christopher K. Gagne

(57) ABSTRACT

A virtual environment manager ("VEM") simplifies the usability of virtual machines and provides users with an enhanced design for creating and/or for managing virtual machines ("VMs"). For example, a user can select description information and management information to be included in descriptors and according to which a VEM will create and manage various VM environments for various host environments. The VEM automatically creates the VM environments and host environments by sending descriptor description information and data files associated with the description information to virtual machine monitors (VMMs), which create the VM environments according to the description information. A VEM at each host may manage VM environments executed by the VMM, according to the descriptor management information. Thus, a set of descriptors to create and manage a set of VMs for a home computer may be easily modified by a user to create and manage a set of VMs for a work or laptop computer.

12 Claims, 11 Drawing Sheets

(Cont.)

(52) U.S. Cl.
CPC .......... *H04L 63/08* (2013.01); *H04L 63/0815* (2013.01); *G06F 2009/45562* (2013.01); *G06F 2009/45566* (2013.01)

(56) References Cited

U.S. PATENT DOCUMENTS

| | | | |
|---|---|---|---|
| 6,351,808 | B1 | 2/2002 | Joy et al. |
| 6,374,286 | B1 | 4/2002 | Gee et al. |
| 6,496,847 | B1 | 12/2002 | Bugnion et al. |
| 6,510,448 | B1 | 1/2003 | Churchyard |
| 6,567,839 | B1 | 5/2003 | Borkenhagen et al. |
| 6,587,937 | B1 | 7/2003 | Jensen et al. |
| 6,609,126 | B1 | 8/2003 | Smith et al. |
| 6,694,347 | B2 | 2/2004 | Joy et al. |
| 6,845,501 | B2 | 1/2005 | Thompson et al. |
| 6,947,979 | B1 | 9/2005 | Pon |
| 6,996,829 | B2 | 2/2006 | Meyer |
| 7,069,413 | B1 | 6/2006 | Agesen et al. |
| 7,080,378 | B1 | 7/2006 | Noland et al. |
| 7,136,800 | B1 | 11/2006 | Vega |
| 7,174,379 | B2 | 2/2007 | Agarwal et al. |
| 7,296,267 | B2 | 11/2007 | Cota-Robles et al. |
| 7,360,221 | B2 | 4/2008 | Alverson et al. |
| 7,519,710 | B2* | 4/2009 | Martin ........................ 709/226 |
| 7,577,722 | B1* | 8/2009 | Khandekar et al. .......... 709/221 |
| 7,735,081 | B2 | 6/2010 | Robinson |
| 8,479,193 | B2* | 7/2013 | Robinson et al. ................ 718/1 |
| 2002/0013802 | A1 | 1/2002 | Mori et al. |
| 2002/0029308 | A1 | 3/2002 | Babaian et al. |
| 2002/0069369 | A1* | 6/2002 | Tremain .............. H04L 63/0209 726/14 |
| 2002/0103889 | A1 | 8/2002 | Markson |
| 2002/0156877 | A1* | 10/2002 | Lu ............................ G06F 8/63 709/221 |
| 2002/0173863 | A1 | 11/2002 | Imada et al. |
| 2003/0101440 | A1 | 5/2003 | Hardin et al. |
| 2003/0217092 | A1 | 11/2003 | Veselov |
| 2004/0010788 | A1 | 1/2004 | Cota-Robles et al. |
| 2005/0039183 | A1 | 2/2005 | Romero et al. |
| 2005/0060704 | A1 | 3/2005 | Bulson et al. |
| 2005/0132367 | A1 | 6/2005 | Tewari et al. |
| 2005/0138664 | A1 | 6/2005 | Neogi |
| 2005/0198303 | A1 | 9/2005 | Knauerhase et al. |
| 2005/0223005 | A1 | 10/2005 | Shultz et al. |
| 2006/0010433 | A1* | 1/2006 | Neil .............................. 717/138 |
| 2006/0136911 | A1 | 6/2006 | Robinson et al. |
| 2006/0136912 | A1 | 6/2006 | Robinson et al. |
| 2006/0143617 | A1 | 6/2006 | Knauerhase et al. |
| 2006/0271575 | A1* | 11/2006 | Harris et al. .................. 707/100 |
| 2007/0022428 | A1 | 1/2007 | Yamasaki |
| 2007/0038987 | A1 | 2/2007 | Ohara et al. |
| 2007/0089111 | A1 | 4/2007 | Robinson |
| 2015/0067683 | A1 | 3/2015 | Robinson |
| 2015/0067684 | A1 | 3/2015 | Robinson |
| 2015/0074663 | A1 | 3/2015 | Robinson |

OTHER PUBLICATIONS

Brad Cook, "Intel Patent Application Sheds Light on Virtualization", the Mac Observer, Jun. 22, 2006, Internet Address: http://www.macobserver.com/article/2006/06/22.16.shtml.
Barrett, Rob, et al., "Intermediaries: New Places for Producing and Manipulating Web Content", Computer Networks and ISDN Systems, vol. 30, No. 1-7, Apr. 1998, XP004121397; ISSN: 0169-7552, (pp. 509-518).
Reasoner, Shelly R., "Management by Proxy Agent", 8080 Wescon Conference Record, Wescon Technical Papers, Western Periodicals Co., USA, vol. 35, Nov. 1, 1991; XP000320534, (pp. 190-195).
Short, Rob, et al., "Windows NT Clusters for Availability and Scalability", Compcon '97. Proceedings, IEEE San Jose, CA, USA, Feb. 23-26, 1997, IEEE Comput. Soc., XP010219504, ISBN: 0-8186-7804-6, (pp. 8-13).
Silberschatz, Avi, et al., "Applied Operating System Concepts", First Edition, 2000, John Wiley & Sons, Inc., (pp. 87-113).
Non Final Office Action mailed Sep. 2, 2009; U.S. Appl. No. 11/016 656.
Intel Corp., Non Final Office Action mailed Dec. 11, 2008; U.S. Appl. No. 10/738,526.
Intel Corp., Non Final Office Action mailed Oct. 10, 2007; U.S. Appl. No. 10/738,526.
Intel Corp., Final Office Action mailed Jun. 23, 2009; U.S. Appl. No. 10/738,526.
Intel Corp., Final Office Action mailed Jun. 20, 2008; U.S. Appl. No. 10/738,526.
Intel Corp., Non Final Office Action mailed Nov. 16, 2007; U.S. Appl. No. 10/738,839.
Intel Corp., Final Office Action mailed Jul. 23, 2008; U.S. Appl. No. 10/738,839.
Intel Corp., Non Final Office Action mailed Mar. 17, 2009; U.S. Appl. No. 10/738,521.
Intel Corp., Final Office Action mailed Nov. 7, 2008; U.S. Appl. No. 10/738,521.
Intel Corp., Non Final Office Action mailed Jan. 10, 2008; U.S. Appl. No. 10/738,521.
Kwak, et al., "Effects of Multithreading on cache performance", Jan. 1, 1999, *IEEE Comp Soc, Abstract*, (Jan. 1, 1999).
Non-Final Office Action received for U.S. Appl. No. 11/016,656, mailed on Sep. 2, 2009, 11 pages.
Notice of Allowance received for U.S. Appl. No. 11/016,656, mailed on Jan. 26, 2010, 8 pages.
Supplemental Notice of Allowability received for U.S. Appl. No. 11/016,656, mailed on Apr. 13, 2010, 6 pages.
Response to Non-Final Office Action received for U.S. Appl. No. 11/016,656, filed on Oct. 1, 2009, 11 pages.
Short et al., "Windows NT Clusters for Availability and Scalability", Compean '97. Proceedings, IEEE San Jose, CA, USA, IEEE Comput. Soc., XP010219504, ISBN: 0-8186-7804-6, Feb. 23-26, 1997, pp. 8-13.
Silberschatz et al., "Applied Operating System Concepts", First Edition, John Wiley & Sons, Inc., 2000, pp. 87-113.
Barrett et al., "Intermediaries: New Places for Producing and Manipulating Web Content", Computer Networks and ISDN Systems, vol. 30, No. 1-7, XP004121397; ISSN: 0169-7552, Apr. 1998, pp. 509-518.
Cook, Brad, "Intel Patent Application Sheds Light on Virtualization", "The MacObserver, Internet document at: www.macobserver.com/article/2006/06/22.16.shtml", Jun. 22, 2006, 3 pages.
Macsimum News, "Intel Patent Reveals Virtual Machine Geared for Consumer Desktops", Internet document at: www.macsimumnews.com/index.php/archive/intel_patent_reveals_virtual_machine_geared_for_consumer desktops/, Jun. 22, 2006, 3 pages.
Reasoner, Shelly R., "Management by Proxy Agent", 8080 Wescon Conference Record, Wescon Technical Japers, Western Periodicals Co., USA, vol. 35, XP000320534, Nov. 1, 1991, pp. 190-195.
Office Action dated May 10, 2016 in U.S. Appl. No. 11/541,712, filed Sep. 29, 2006, and related attachments (18 pages).
Office Action dated Jun. 17, 2016 in U.S. Appl. No. 14/520,045, filed Oct. 21, 2014, and related attachments (18 pages).
Office Action dated Jun. 30, 2016 in U.S. Appl. No. 14/538,451, filed Nov. 11, 2014, and related attachments (20 pages).
Office Action dated Jul. 14, 2016 in U.S. Appl. No. 11/538,461, filed Nov. 11, 2014, and related attachments (21 pages).
Kwak et al., "Effects of Multithreading on cache performance", IEEE Transactions on Computers, vol. 48, No. 2, Feb. 1999, pp. 176-184.

* cited by examiner

VIRTUAL ENVIRONMENT MANAGER FOR CREATING AND MANAGING VIRTUAL MACHINE ENVIRONMENTS

RELATED APPLICATION

This application is a continuation-in-part (CIP) of U.S. patent application Ser. No. 11/016,656 filed Dec. 17, 2004 now U.S. Pat. No. 7,735,081 entitled "Method, apparatus, and system for transparent unification of virtual machines."

FIELD

Embodiments of the invention relate generally to the field of computer system design for systems having virtual machines (VMs). More particularly, embodiments relate to enhanced description information and a simplified design for provisioning, creating, sharing, and managing virtual machines.

BACKGROUND

Virtualization technology enables a single host computer running a virtual machine monitor ("VMM") to present multiple abstractions and/or views of the host, such that the underlying hardware of the host appears as one or more independently operating virtual machines ("VMs"). Each VM may function as a self-contained platform, running its own firmware ("BIOS"), operating system ("OS") and/or a software application(s). The VMM manages allocation and virtualization of host resources, and performs context switching as necessary to cycle between or across various virtual machines according to a round-robin or other scheduling algorithms.

Given the complexity and processing requirements of virtualization, this technology has typically been available only on workstations, servers and/or mainframes for use by sophisticated users. As processor technology advances, however, virtualization is being made available in the desktop environment for use by average users.

As virtualization becomes more commonly available in the desktop environment (e.g., a desktop host) the most likely users are unlikely to be computer professionals (e.g., information technology specialists in corporate environments) but rather less sophisticated users (e.g., home personal computer ("PC") users and/or non-technical, less sophisticated corporate users). The applications that run within the desktop environment and the types of uses for the applications may also differ from corporate applications. For example, one use of virtualization in a home (and the associated advantage of running one or more independent VMs on a host) may be for each family member to be allocated a VM partition with their own customized environment, e.g., a gaming VM partition, a Personal Video Recorder ("PVR") appliance VM, an enterprise Information Technology ("IT") supplied VM for telecommuting, etc. Moreover, it is likely that each user may have several VMs, each possibly dedicated for a specific task such as a dedicated VM for internet browsing, one for gaming applications, one replicating a user's legacy system (e.g. previously owned PC and SW environment), etc. Some might be scheduled to run 24×7 (e.g. a personal video recorder ("PVR")), while others are launched and exited frequently. In this environment, the average home PC user may be overwhelmed by the task of understanding and/or managing the VM partitions (e.g., moving files, setting up access permissions, etc.).

BRIEF DESCRIPTION OF THE DRAWINGS

Embodiments of the present invention are illustrated by way of example and not limitation in the figures of the accompanying drawings in which like references indicate similar elements, and in which.

DETAILED DESCRIPTION

Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Various embodiments of the present invention simplify the usability of virtual machines (VMs) and provide users with an enhanced design for creating virtual machines and/or for managing virtual machines, such as using a logically unified (monolithic) compute environment. Such a design may include a system, apparatus, method, scheme, process, software application, description information, data files, and/or the like. For example, a virtual environment manager (VEM) or a "VEM module" can be used for provisioning of VM environments, sharing VM environments, VM environment creations/instantiations, and/or VM environment management. This can be useful for propagating monolithic configurations to a large set of users, sharing best known environments among family/friends/colleagues, or permitting collaborative workspaces. Also, a VEM may provide creation and management of VM environments for unsophisticated users. In an embodiment a VEM works in collaboration or as an extension to a VMM. In an embodiment a VEM works in collaboration or as an extension to a VM.

Figure 1:
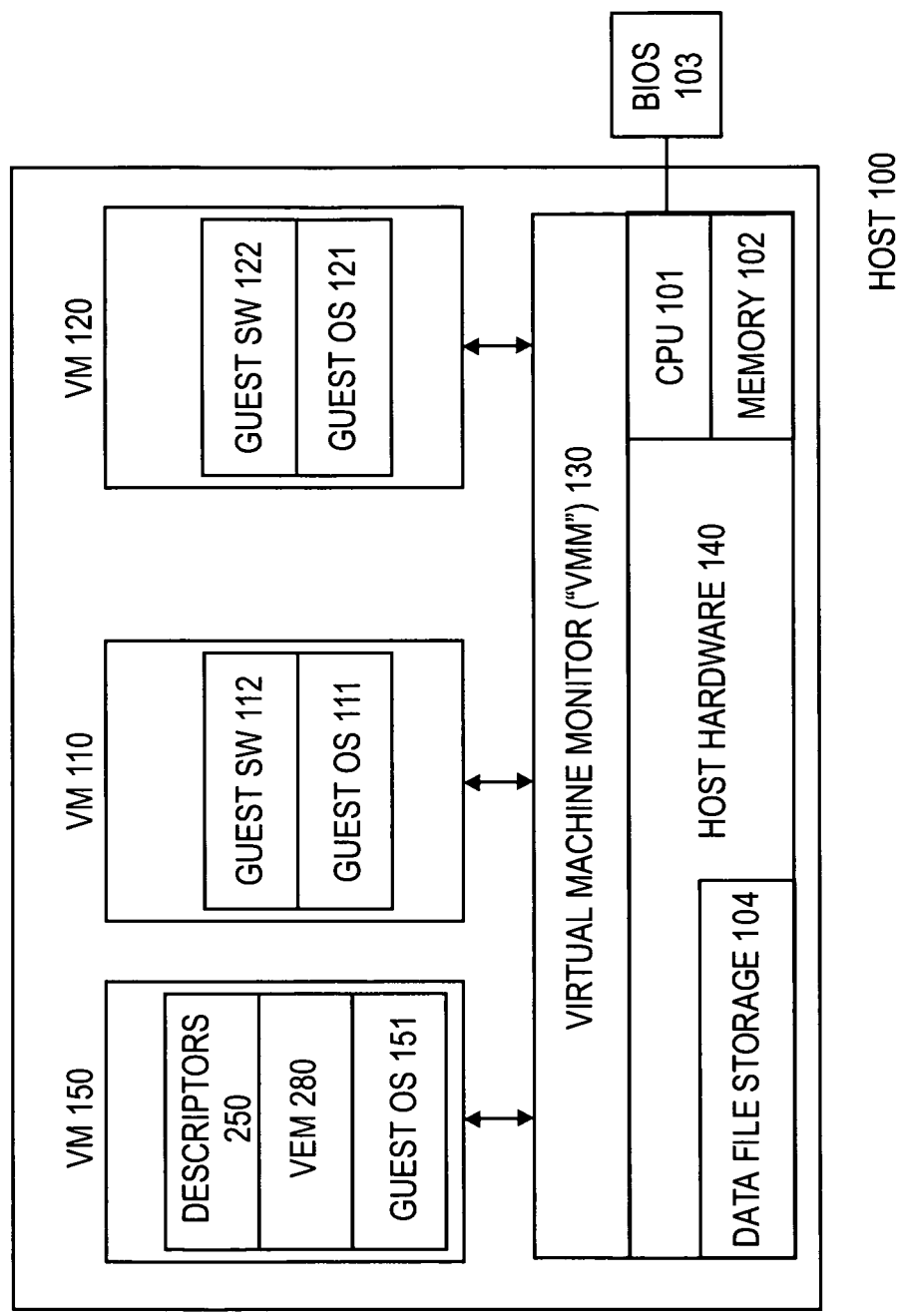
FIG. 1 illustrates a host computing device having a VEM as a VM.

The VEM may manage VM environments run or being executed on a VMM by continuously monitoring and/or filtering incoming and/or outgoing data (e.g., file requests, network ports/streams (e.g. Hyper Text Transport Protocol ("HTTP")), files, streams and/or attachments) and make automatic determinations regarding how to manage the data (e.g., where to store files, when and/or whether to deliver the files, execute the files, etc.). In one embodiment, the VEM may perform such behaviors, managing, monitoring and/or filtering at "choke points" in and out of the VMs running on the VM host (e.g., a VMM host environment), i.e., points on the VM through which all input/output (I/O) to and from the VM typically traverse. The term "host" may be used herein to describe a host environment, such as a VMM environment, a VMM host, a VMM host environment, a host physical environment, or a VM environment run on a single computing processor for one or more virtual machine environments. Also, a "host" may refer to a single host computer, host machine or host electronic device having a processor and a main memory able to run a virtual machine monitor ("VMM") to present multiple abstractions and/or views of the host, In some cases components of a "host" or a "system" supporting or including a VEM may include a computer processor (and/or platform) with virtual-machine (VM) support (i.e. a virtual machine monitor (VMM) in hardware, software, firmware, or a combination thereof). For example, FIG. 1 illustrates a host computing device ("Host 100") having a VEM hosted in a VM. FIG. 1 shows host 100 (e.g., a VMM host or VMM host environment) including VM 110, 120, and 150 running on VMM 130. As previously described, a virtual-machine monitor ("VMM 130") typically runs on the host platform and presents an abstraction(s) and/or view(s) of the platform (also referred to as "virtual machines" or "VMs") to other software. Although only three VM partitions are illustrated ("VM 110", "VM 120", and "VM 150", hereafter referred to collectively as "VMs"), these VMs are merely illustrative and additional virtual machines may be added to the host. For instance, in some embodiments, only VM 110 and VM 150 may exist on host 100. Alternatively, in some cases, VMs in addition to VM 110 and VM 120 may exist with VM 150 on host 100. Additionally, such variations may occur over time for given host machine; that is, the number and configuration of VMs running on a given host may vary over time. VMM 130 may be implemented in software (e.g., as a standalone program and/or a component of a host operating system), hardware, firmware and/or any combination thereof. For instance, VMM 130 may be a VMM configuration that stands alone and can handle devices (e.g., has device drivers, etc.), or, alternatively, is an "OS-hosted" VMM (e.g., such as where the VMM and hosting OS collaborate), or otherwise as known in the art. For an OS-hosted VMM, the VMM may have a driver or some other interface into the OS, and may rely on the hosting OS for device drivers etc. Also, in some cases, the guest OS's may know they are being virtualized (e.g., a situation that may be called paravirtualization), to gain certain efficiencies, etc. Host 100 may be, for example, embodied in a desktop computer, a laptop computer, a hand held computing device, a personal computer (PC), a computer server, a computer that is part of a computer network, a work station, an electronic device, a cell phone, a PDA/handheld computing device, a Ultra Mobile PC, a computational device, or the like. For instance, a host may be a computing environmental context or setting for a user, such as a context that travels in the communication/computing "ether" with the user.

VM 110, VM 120, and VM 150 may function as self-contained platforms respectively, running their own "guest operating systems" (i.e., operating systems illustrated as "Guest OS 111", "Guest OS 121" and "Guest OS 151" (hosted by their respective VMs 110, 120 and 150) and hereafter referred to collectively or individually as "Guest OS") and other software (illustrated as "Guest Software 112", "Guest Software 122" and "VEM 280", and hereafter referred to collectively or individually as "Guest Software"). Each Guest OS and/or Guest Software operates as if it were running on a dedicated computer. That is, each Guest OS and/or Guest Software may expect to control various events and have access to hardware resources on Host 100. The VMM need not just project a representation of the physical platform or give direct access to resources. The VMM may also create new virtual devices (e.g. a network interface card ("NIC")) while possibly using Host 100's processor and similar devices (e.g., another NIC) on Host 100 to emulate those virtual devices. The virtual platform presented to a given VM by VMM 130 may be a hybrid of virtual and physical elements. Therefore, within each VM, the Guest OS and/or Guest Software may behave as if they were, in effect, running on the virtual platform hardware, supported by the VMM 130. In reality however, VMM 130 has ultimate control over the events and hardware resources (which may be physical, such as Host Hardware 140, or virtual as created by VMM 130), and allocates resources to the VMs according to its own policies. Recursive or layered virtualization/VM designs may also be possible, e.g., VM 110 may host another virtual host (which may appear to have behaviors like physical Host 100 or some other virtual host platform, or a hybrid platform.) These types of recursive designs are well known to those of ordinary skill in the art and further description thereof is omitted herein in order not to unnecessarily obscure embodiments of the present invention. VMM 130 runs on and accesses hardware Host Hardware 140 (and firmware (BIOS) 103) to accomplish these tasks.

Hardware 140 includes central processing unit (CPU) 101, memory 102, and data file storage 104. CPU 101 is coupled to basic input/output systems (BIOS) 103. Hardware 140 may represent physical devices that may be installed in or on host 100, such as a keyboard, mass storage controllers, network interfaces, a mouse, sound cards, etc. BIOS 103 may represent firmware/software instructions that may be stored, for example, in memory 102 or in a separate, non-volatile memory (as shown).

CPU 101 may be a processor, such as a processor capable of performing the necessary processing to support VMM 130 and various virtual machines running on VMM 130. CPU 101 may be the central processing units (CPUs) of the host and, thus, control and coordinate the overall operation of the environment. In certain cases, CPU 101 may comprise one or more central processing units (CPU).

Data file storage 104 may represent a storage memory, mass storage device, persistent storage device, physical memory, disk storage, disc drives, flash memory, a secondary storage device (e.g., other than main memory or random access memory (RAM)), and/or other data storage devices or capabilities of computing devices that may be accessed or referenced locally and/or over a network, wired or wireless medium, and/or the Internet, as known in the art. Moreover, data file storage 104 can represent data stored on or at network servers, file servers, Internet servers, and/or client devices that store data in various types of memory (e.g., in mass storage devices, such as disk drives, and/or a "storage subsystem" having a number of mass storage devices, such as disk drives, which may be in a disk array).

Likewise, memory 102 may store instructions and/or data to be operated on and/or accessed by CPU 101, VMM 130, and/or VEM running on host 100, such as by storing the instructions and/or data at addresses of memory 102.

Memory 102 may be or include the "main memory" of host 100. Memory 102 represents any form of random access memory (RAM), read-only memory (ROM), flash memory, or the like, or a combination of such devices.

To create and manage applications running on the various VMs (e.g., VM environments) on a host (e.g., host 100), a user typically has to know which VM the application is running in and manually switch to the appropriate VM. Thus, for example, if the user desires to create and manage a video game (e.g., Guest Software 112 running on VM 110), the user has to manually access VM 110, create the application and management information, and launch the game. Thereafter, if the user desires to create and manage another application (e.g., Guest Software 122 running on VM 120), the user has to determine which VM the application is running in and manually switch to that VM to create and manage the application. Although switching between or across VMs may not be especially cumbersome (e.g., a keystroke sequence to switch from one VM to another), keeping track of what applications are running on each VM, how and what configuration of an application has been or is desired to be created, and how each application has been or is desired to be managed, may prove to be difficult, especially if the host is configured to run more than two VMs (as is likely). For a home PC user, keeping track of the various VM environments (e.g., partitions) that are running on his or her PC and the applications running in each partition may prove to be highly complex. This complexity is multiplied by keeping track of the management of the various VM environments that are running in each partition. Another multiplication of complexity occurs by trying to keep track of different VM environments, applications, and management for more than one host, such as the different setups for a home PC, a laptop PC, and a work PC. The typical home PC user may not be technically savvy enough to understand the underlying view of the VM host and as a result, may have difficulties and/or shy away from fully utilizing a host, or hosts, running multiple VMs.

According to embodiments, VM descriptors (e.g., descriptors 250) and VEMs (e.g., VEM 280) may be used to provide users with a simplified and enhanced design for provisioning, creating, sharing, and managing VMs (e.g., such as by providing a design for provisioning, creating, sharing, and managing VM environments). For example, FIG. 1 also shows VM 150 including descriptors 250, virtual environment manager (VEM) 280, and guest OS 151. Guest OS 151 may be described as a host OS or as a service OS, as known in the art. Descriptors 250 may be one or more descriptors as described herein. Guest OS 151 may be an operating system, such as disk operating system (DOS), Windows® (by Microsoft Corporation of Redmond, Wash.), UNIX (of Unix System Laboratories®), LINUX® (LINUX® operating system, originally conceived by Linus Torvalds, but now under broad, community-based development by individuals and organizations worldwide. LINUX® is a registered trademark of Linus Torvalds in the U.S. and other countries. Versions of LINUX® are shipped by Red Hat Corporation of 1801 Varsity Drive, Raleigh, N.C. 27606), OS/2® (by Microsoft Corporation of Redmond, Wash.), OS/9® (by Apple Computer of Cupertino, Calif.), XENIX® (by Microsoft Corporation of Redmond, Wash.), etc. as known in the art. For instance, OS 151 may be an operating system such as WINDOWS XP®, or another WINDOWS® operating system by Microsoft Corporation of Redmond, Wash. OS 151 may also be a MACINTOSH® operating system by Apple Computer of Cupertino, Calif.

VEM 280 may be a VEM as described herein and may have an instantiation system and/or management system. VEM 280 may have access to interfaces to, and/or be able to reference any or all VMs, VMMs, hardware of host 100; interfaces to, network connections to, or other accesses to or from host 100. For instance, VEM 280 interfaced or linked to VMM 130, such as in a configuration that VEM 280 has interfaces or links between (or across) VMM 130, VM 110, and VM 120. Interfaces may be implemented in software, firmware or hardware. (Firmware and hardware may include PAL code or system management codes and microcode.) VEM 280 may have to assess whether or not VMs exist in a layered virtualization/VM environment, and may exist or have interfaces and/or hooks across all VM layers. Also, if multiple VMMs exist on a host or on multiple hosts, VEM 280 may have access to the multiple VMMs. (Multiple VMMs can exist on a single physical machine if, for example, the hardware resources are partitioned. Or, for example, multiple VMMs can exist in a layered virtualization environment.) Similarly, VEM 280 may have access to other VEMs located on or at VMM 130, host 100, or other VMMs or hosts linked to host 100. A link may refer to a network connection, internet connection, or other link for communicating data between or across computing entities. VEM 280 may include an instantiation system, such as for creating VM environments and/or host environments. Likewise, VEM 280 may include a management system, such as to implement a management policy to manage other VMs or VM environments. The instantiation system may use description information of descriptor 250 to instantiate VM environments. Likewise, the management system may use management information of descriptors 250 to manage the VM environments.

VM descriptors (e.g., descriptors 250) and VEMs (e.g., VEM 280) may be used to instantiate or create VM environments (e.g., VMs or VM instances created using VM environment descriptors that are modifications or combinations (e.g., modified versions) of other VM environment descriptors for a single user or user authorization), and to manage such VM environments and their descriptions. Moreover, according to embodiments, VM environment descriptors may provide information that is more detailed, richer, more flexible, and more manageable than other VM description information, other VM management information, and/or other information derived from VMs without a VEM, without a VM environment descriptor, and/or without a VM environment. Specifically, these VM environment descriptors may allow a VEM to create, aggregate, and manage VM descriptors and VM environments, such as, but not limited to the following (e.g., the following behaviors):

Resources including:
    VM resource requirements (e.g., devices, disk, memory, networking, hardware 140, Internet 505, etc),
    Software configurations that run in a given VM (e.g., OS, Applications, guest SW 112, guest OS 111),
    Other such resources (e.g., resources of another host, etc.).

Data including:
    File systems (e.g. user data files, OS and software application files, etc), user customizations, and other VM environment-specific data (Can be encrypted for security),
    Other such data.

Security and Identity including:
    User identity, permissions and access control lists,
    Encryption keys/protocols, Other external world protections (e.g. allowed network access and firewall restrictions),
Single [user] sign-on authentication,
Other such security and identity.
Management Policies including:
  Local (e.g. personal, family, work group, etc) or Global (e.g. corporate),
  Other such management policies.
Log files including:
  Usage histories and logs
  Other such log files.

Thus, a specific VM environment may be similar to, copied from, a modified version of, and/or created using or including information from a VM environment descriptor for another VM environment or instantiation, except the specific VM environment has a constrained facet and/or extended facet on any of the above behaviors. Similarly, a specific VM environment may have more than one constrained facet and/or extended facet on any of the above behaviors, as compared to another VM environment or instantiation (e.g., according to the modified version of the descriptor as compared to another VM environment or instantiation). For some specific examples of such descriptors and VM environments see FIG. 4. In some cases, a VEM may be described as a module that includes a virtual machine environment management and policy module. Also, a VM environment may describe a virtual machine, an instantiation of a virtual machine according to a VM environment descriptor, or an instantiation of a virtual machine that may or may not have constrained facets and/or extended facets as compared to an instantiation of another virtual machine. A behavior may include an ability, access, function, or other characteristic related to resources, data, security and identity (e.g., user identities, such as to allow for sign-on access to a VEM), permissions, applications, log files, and/or management thereof. For example, a constrained facet of a behavior may include management, restriction, limitation, denial, exclusion, or constraint of a behavior (e.g., of an ability, access, function, or other characteristic related to resources, data, security and identity, permissions, applications, and/or management thereof). On the other hand, an extended facet of a behavior may include management, addition, extension, increase, inclusion, or incorporation of a behavior (e.g., of an ability, access, function, or other characteristic related to resources, data, security and identity, permissions, applications, and/or management thereof). Such constrained facets and/or extended facets may be the result of using a modified version of or as compared to the descriptor of an instantiation of another virtual machine.

For example, a VEM may create virtual machine environments according to descriptors and using data files associated with the descriptors. The VEM may create the virtual machine environments by sending, distributing, and/or designating descriptor information and data files associated with the descriptor information (e.g., a "set" of one or more data files and metadata to be used and/or modified by the VMM and/or VM environment during creation, execution, and/or management of a VM environment) to a virtual machine monitor (VMM), which creates the VM environment according to the descriptor. Moreover, the VEM may manage VM environments executed by the VMM, according to the descriptors. The VEM may reference descriptors such as by combining descriptor information from one or more descriptors to create another descriptor. The VEM may also access data files according to descriptor information, such as by accessing binaries, software applications, audio data, video data, text data, blocks of data, graphics data, or other data from a persistent storage device, storage memory, or accessed otherwise. Moreover, descriptor information and/or descriptors may be imported from similarly to the access of data files described above.

According to embodiments, a VEM may be accessed using a unified, single sign-on authentication, such as to allow a user to use a unification console to access a VEM and to specify or select separate host environment management policies for a VM, a user, a host, a home desktop computer, a laptop computer, and/or a work computer. Thus, an environment having such an enhanced design of one or more VEM modules and such sign-on access to the VEM(s) may be described as a "logically unified and/or monolithic". Similarly, a compute environment including a collection of one or more VM descriptors, VM instantiations, and/or user identities (e.g., according to or selected at one or more VEM modules accessed by users according to the user identities) may be described as a "logically unified (monolithic) compute environment".

Moreover, it is considered that "collecting" (e.g., such as by a user using a VEM and/or a unification console) and/or a "collection" of one or more user identities, VM descriptions, VM instantiations, hosts, VM environments, and/or VMMs may include one or more user identities, VM descriptions, VM instantiations, hosts, VM environments, and/or VMMs related or associated by having or being accessible by one or more common, same, equal, or similar user identities, VM descriptions, VM instantiations, hosts, VM environments, and/or VMMs. In some cases, "collecting" (e.g., such as by a user using a VEM and/or a unification console) and/or a "collection" of one or more user identities, VM descriptions, VM instantiations, hosts, VM environments, and/or VMMs may include a collection of one or more VM environments for a single user, group of users, single user authorization, and/or group of users authorization. Related or associated may be described as applying to similar or the same one or more users, groups of users, families (immediate or extended) of users, user authorizations, group of users authorizations, VEMs, VMMs, hosts, home desktop computers, laptop computers, work computers, company computers, and/or the like.

Also, according to embodiments, the logically unified compute environment may be created across one or more hosts (e.g., the environment may exist on only on host, or on or across numerous hosts). Similarly, the logically unified compute environment may be created across a collection of one or more user identities (e.g., identities that are related or are not related). For example, the logically unified compute environment may be created or apply only to one user with one or many different logins; many users, each with one or several logins; and/or one or more users, each with several logins where each login provides/accesses different privileges (e.g., different constrained facets and/or extended facets). Next, the logically unified compute environment may be created across one or more VMMs, such as where each VEM manages one or more, possibly disparate VM environments running under different VMMs (e.g., which may or may not include the managing VEM).

It is also contemplated that the unified compute environment may include a collection of VM descriptors and/or instantiations may be distributed across one or more hosts. Likewise, the unified compute environment may include a collection of VM descriptors and/or instantiations designated across one or more hosts. Designation or assignment of VM descriptors and/or instantiations to specific hosts permits control over a variety of practical matters including, but not limited to, cost, availability, reliability, scaling, resource use and load balancing, host security, and so on.

Using VM environment descriptors, embodiments of the present invention provide users with improved VM creation and management designs or systems that enhances the usability of virtual machines. More specifically, embodiments of the present invention improve creation of VM environments and host environments in a virtualized environment, such as to allow a user to create a separate host environment (e.g., a collection of one or more VM environments for a single user, group of users, single user authorization, and/or group of users authorization) for a home desktop computer, a laptop computer, and a work computer from a VEM (e.g., from a single VEM). In an embodiment the VEM facilitates aggregation of this collection. The VM or host embodiments can be created using an instantiation system of a VEM (e.g., see VEM instantiation system 380 of FIG. 3). The instantiation system may be a portion of a VEM. The user may select description information (e.g., description information that is part of the descriptor and describes a "VM configuration" for creating a VM environment) describing each VM environment, its behavior and/or constrained facets and/or extended facets on its behavior. This information may be a detailed description of a configuration for each VM that includes a description of behaviors, resources (e.g., access to a hardware resource), data, security and identity (e.g., a user sign on authentication for access and/or a user permission for use), functions, permissions (e.g., a read data permission and/or a write data permission), applications (e.g., functionality of a software application), constraints on facets of behaviors (e.g., constraints described by the description information for creating this VM environment as compared to a descriptor of another VM environment), etc., for each VM environment of each host environment, and create a descriptor for each VM environment. A VEM at each host may use the descriptors to create or instantiate the appropriate VM environments for each host environment according to the description information selected by the user for each descriptor. Thus, the VMM of each host may run each VM environments differently or the same on each host, as desired by the user.

Moreover, such creation may be automated, such as where after selection of the description information, the VEM creates the VM environments without user selection of data files associated with the description information. For example, without further user interaction, the VEM accesses, obtains, reads, or acquires the appropriate data files to be used to create the VM environment according to the user selection of description information.

Similarly, embodiments of the present invention improve management of the VM environments and host environments in a virtualized environment, such as by allowing a user to specify or select separate host environment management policies (e.g., management information that is part of a descriptor and describes a "VM management policy" for managing a VM environment) for a user (e.g., for a single user, group of users, single user authorization, and/or group of users authorization), a host, a home desktop computer, a laptop computer, and a work computer. Selection of those management policies and/or management according to those policies may be done at or from one or more VEMs (e.g., from a single VEM). The VM or host embodiments can be managed using a management system of a VEM (e.g., see VEM management systems 684 and 686 of FIGS. 6A and 6B). The management system may be a portion of a VEM, and may or may not include an instantiation system. This information may be included in a detailed description of a management policy for each VM.

In some cases, a management policy may include a personal management policy, a family management policy, a work management policy, a desktop computer management policy, a laptop computer management policy, and a corporate management policy, etc. Moreover, these management policies may be related or associated, such as where a policy applies to VMs for one or more users, groups of users, families (immediate or extended) of users, user authorizations, group of users authorizations, VEMs, VMMs, hosts, home desktop computers, laptop computers, work computers, company computers, and/or the like.

For example, the user may select management information describing security and identity, management policies, log files, constraints on facets of (e.g., a constraints on behaviors of an executed VM environment, according the management information of a descriptor for that VM environment). The management information may also describe exclusions to, and/or restrictions, and/or enhancements, and/or extensions to VM behaviors, resources (e.g., access to a hardware resource), data, security and identity (e.g., a user sign on authentication for access and/or a user permission for use), functions, permissions (e.g., a read data permission and/or a write data permission), applications (e.g., functionality of a software application), etc., for each VM environment of each host environment, and include that information in a descriptor for each VM environment. Facets that are not the same or equal, but are not constrained either may be described as extended facets or enhanced facets. In some sense, these facets may be described as un-constrained facets because they may be facets that add an "extension" or "enhancement" to a given configuration (e.g., according to an "extension" or "enhancement" to a given descriptor). Thus, an enhanced and/or extended facet could enhance and/or extend (e.g., but not just constrain) VM behaviors by adding some new capability/permission/etc. . . .

A VEM at each host may use the descriptors to manage VM environments running or executed on each host environment according to the management information selected by the user for each descriptor. Such management may include automating the constraints or enhancements on facets of behaviors, stopping, denial, classification, replication, filtering and/or transforming of data and/or data requests entering and leaving these VM environments.

Moreover, such management may be automated, such as where after selection of the management information, the VEM manages the VM environments without user selection of management policies. For example, without further user interaction, the VEM manages by causing stopping, denying, classification, replication, filtering and/or transforming of data and/or data requests entering and leaving these VM environments (e.g., See FIGS. 6A and 6B).

Thus, (e.g., with respect to creation of VM environments) a constraint (e.g., a constrained facet and/or extended facet) of a behavior may describe a restriction of, extension of, or difference (e.g., according to a modified version of a descriptor) between access to a hardware resource, functionality of a software application, a read data permission, a write data permission, a user sign on authentication for access, a user permission for use, and/or a management policy of the second VM environment as compared to a first VM environment. In addition, (e.g., with respect to management of VM environments) a constraint of a behavior may describe a restriction (e.g., according to management information of a descriptor) of one of access to a hardware resource, functionality of a software application, a read data permission, a write data permission, a user sign on authentication for access, and/or a user permission for use of a VM environment, etc.

In some cases, the VEM module (e.g., a VEM) may be described as "long-lived", such as by being present, existing, or being executed whenever a VMM of a host is present, existing, or being executed. In some cases, the VEM module may be hosted in a "true" virtual machine (e.g., FIG. 1). Alternatively, in some embodiments, a VEM module may be described as part of the "host" software (e.g. hosting OS, if any, such as VM workstation product) and VMM.

Figure 2:
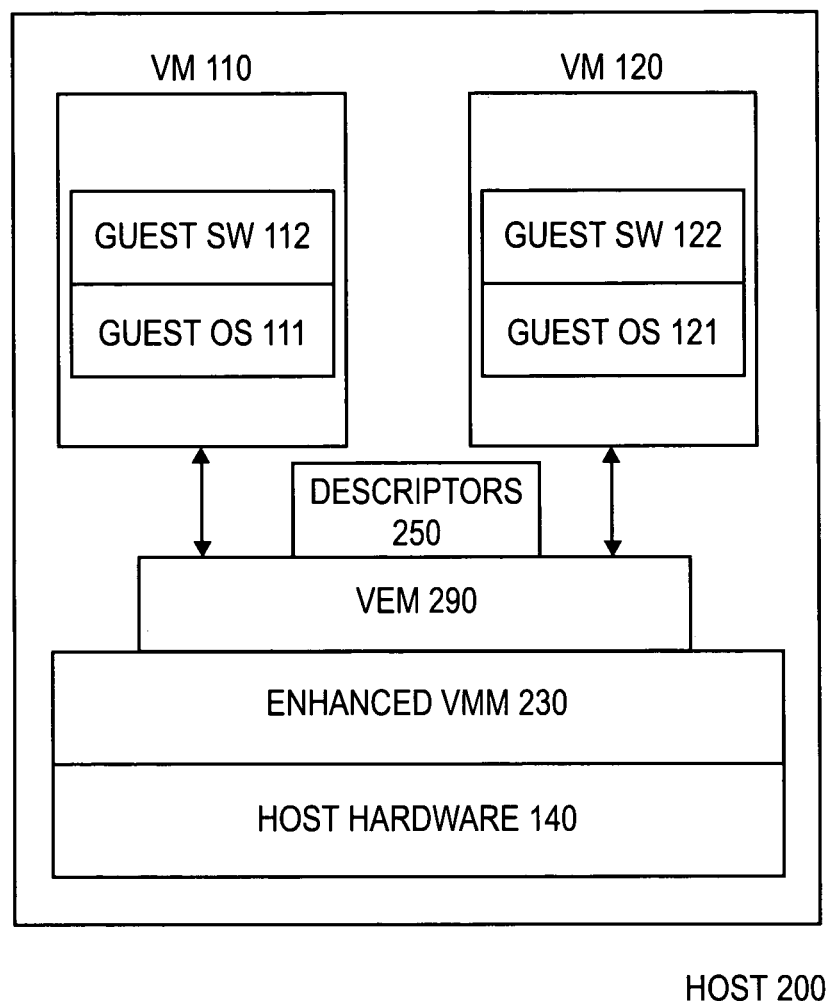
FIG. 2 illustrates a host computing device having a VEM as part of a VMM.

For example, FIG. 2 illustrates a host computing device having a VEM as part of a VMM. FIG. 2 shows host 200 including VEM 290 interfacing or linking enhanced VMM 230, descriptors 250, VM 110, and VM 120. VEM 290 may provide the same functionality as VEM 280 (FIG. 1). Moreover, it may be transparent to the user whether or not the user is interacting with VEM 280 or VEM 290. Enhanced VMM 230 may provide all the functionality of VMM 130. In some cases, enhanced VMM 230 may be described as enhanced by including VEM 290 and/or descriptors 250.

According to some embodiments, a VEM may be described as or include a virtual (machine) environment instantiation or creation system to instantiate or create VMs, VM environments, and/or VM instances, such as according to description information contained in a descriptor. Similarly, a VEM may be described as or include a virtual (machine) environment management system to manage VMs, VM environments, and/or VM instances, such as according to management information contained in a descriptor and/or according to a management policy.

Figure 3:
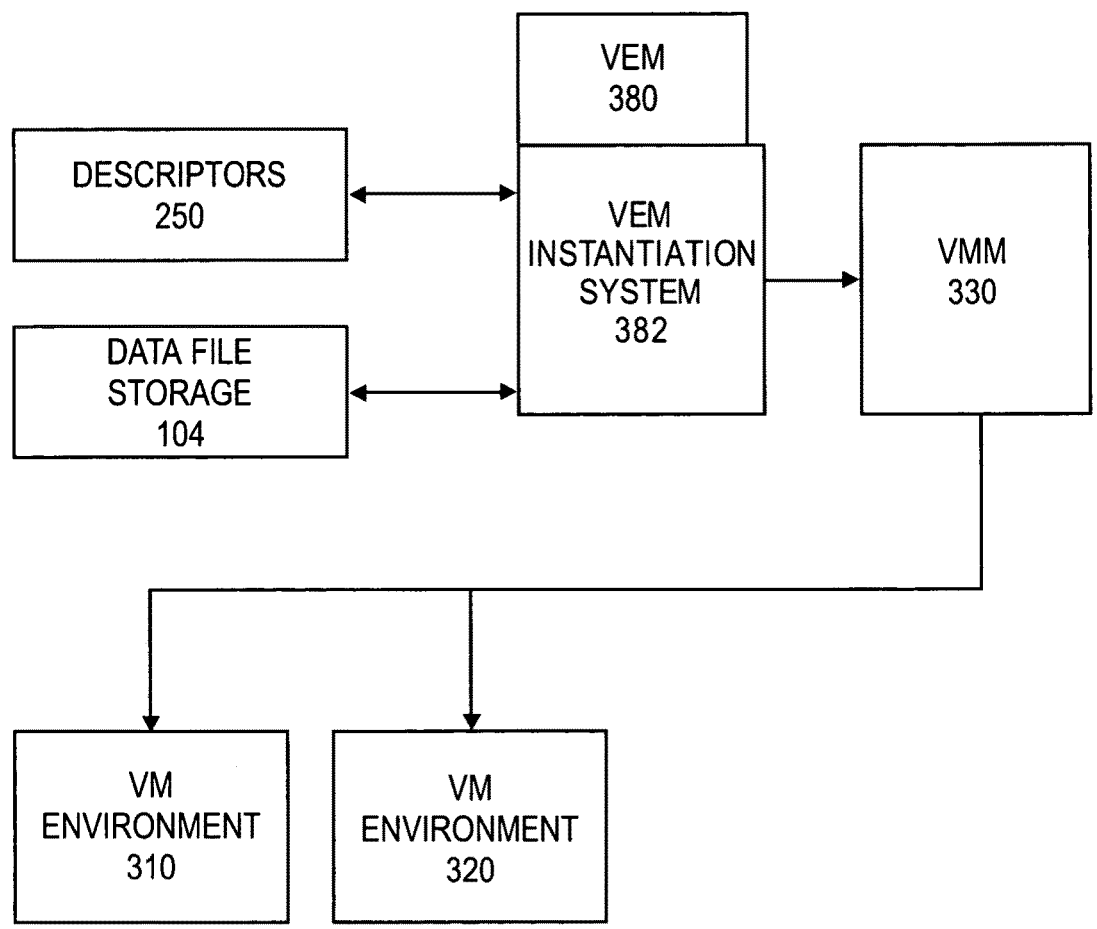
FIG. 3 illustrates creation of VM environments.

For example, FIG. 3 illustrates creation of VM environments. FIG. 3 includes VEM 380 having VEM instantiation system 382 having reference to, accessing, interfacing to, and/or linked to descriptors 250, data file storage 104, and VMM 330, such as through VEM 380 or interfaces thereof. Similarly, VMM 330 is interfaced with or linked to VM environment 310 and VM environment 320. VEM 380 may be a VEM as described above with respect to VEM 280 or VEM 290. VEM instantiation system 382 may be a system of a VEM, or a portion of VEM 380. Likewise, VMM 330 may be a VMM as described above with respect to VMM 130 or VMM 230.

VM environment 310 may be a VM, a VM environment, or a VM instance as described herein. For example, VM environment 310 may be a VM created by VEM referencing description information and/or management information from one or more descriptors of descriptors 250 and accessing one or more data files stored in data file storage 104 according to the description information, and sending (or distributing) the description information and/or management information and data files to VMM 330. In turn, VMM 330 may create, or instantiate VM environment 310 according to the descriptor information. Likewise, VMM 330 may execute VM environment 310. Moreover, VEM 380 may manage VM environment 310 according to the management information (management interface or link not shown in FIG. 3 but shown in FIGS. 6A and 6B, such as management systems 684 and 686). VM environment 320 may be a VM environment similar to, created similar to, and/or managed similar to environment 310. Environments 310 and 320 may exist on the same or on separate hosts or VMMs. Similarly, environments 310 and 320 may be managed by the same or different VEMs. In a situation where environments 310 and 320 exist on a single host, they may describe a "host environment." For example, referring to FIG. 2, if environment 310 represents VM 110 and environment 320 represents VM 120, those VMs describe the host environment of host 200 (e.g., such as a host environment where no other VM environments are running or being executed).

A VEM descriptor (e.g., descriptor 250) may provide a description of how to construct a similar environment, but may lack specific files or binaries. For instance, a descriptor may include description information: a VM with 250 GB of HDD, 1 GB of memory, network with only 3 ports open, running Linux, and the "Elm" mail application. It could also include additional properties of the VM such as security policies (e.g., management information). The VEM descriptor may also include meta data relating to specific applications contained within a VM (e.g., description information). For example, it could include details about configuration data for the Elm e-mail application and windows media player (e.g., description information). However, it should be noted that the VEM descriptor may contain only meta data and not application binaries or data files.

In some cases, a descriptor may include a single or only one "piece" of information of a description or management information. A "piece" of information may be described an "an information" or "one information". For instance, a descriptor may only describe a software application, a memory address, a password, etc. Alternatively, a descriptor may include more than one information of description and/or management information. For instance, a descriptor may include more than one information of only description or management information. Alternatively, a descriptor may include more than one information of description information and of management information.

In addition, and accordingly, a VM environment may include the image of a virtual machine and its constituent elements (processor state, memory and disk images (files, binaries), etc). (A descriptor can always be derived from a VM environment through appropriate abstraction.) For example, one VM environment might be for Susan's personal video recorder (PVR) VM. In addition to the VM environment hosting the PVR, other VM management information might be associated with the instance including giving a user (e.g., Susan) read (R)/write (W) permissions, Susan's family R-only permissions as well as various network restrictions (such as permitted schedule update site, local IP addresses only and IP-based remote control).

The VEM module permits hybrid VM instantiation (e.g., to create VM environment which may be a VM instantiation according to a combination of a VM environment descriptor) to be constructed in which only select elements are included (e.g. a specific set of files, but not all files, such as a single document or document set.) It may allow for decomposition of the VM itself (into constituent applications etc) such that a VEM module can create VM environments which may include constraining facets on the behavior of the original VM. For example, a VEM can create a VM environment of the E-mail VM (a VM which is primarily dedicated to running the users e-mail application) while constraining the downloading of e-mail from the server, mandating that this incantation (e.g., VM environment) of the e-mail VM must leave e-mail on the server. This may be particularly useful when this VM environment is being created or instantiated for example on a publicly accessible host or computer. By disallowing the downloading of e-mail into this VM environment, the user may not inadvertently leave any e-mail on the public host.

The VEM module also permits sets or collections of VM environment descriptors and/or VM environments to be collected. The most common collections include sets of descriptors and/or VM environments which have a single security/identity/management policy (e.g., a collection of one or more VM environments for a single user, group of users, single user authorization, and/or group of users authorization).

For example, at user login the VEM module can be used locate a desired VM or host environment and to authenticate to that environment. Numerous possible VMs (with a limited set of applications) might coexist as part of a user's "environment" (e.g., for a single user or single user authorization). These might include virtual partitions for gaming, personal video recorder, information technology (IT)/teleconmuute partition, digital jukebox for music/movies, e-mail and instant messaging (IM), web browsing, picture/video editing, Voice over Internet Protocol (VoIP), home automation, finances/banking/investment control, legal, location manager, personal information manager (PIM) functions, travel, test partition for new applications, legacy software, etc. The VEM module helps describe, instantiate, manage, and share such an environment.

Figure 4:
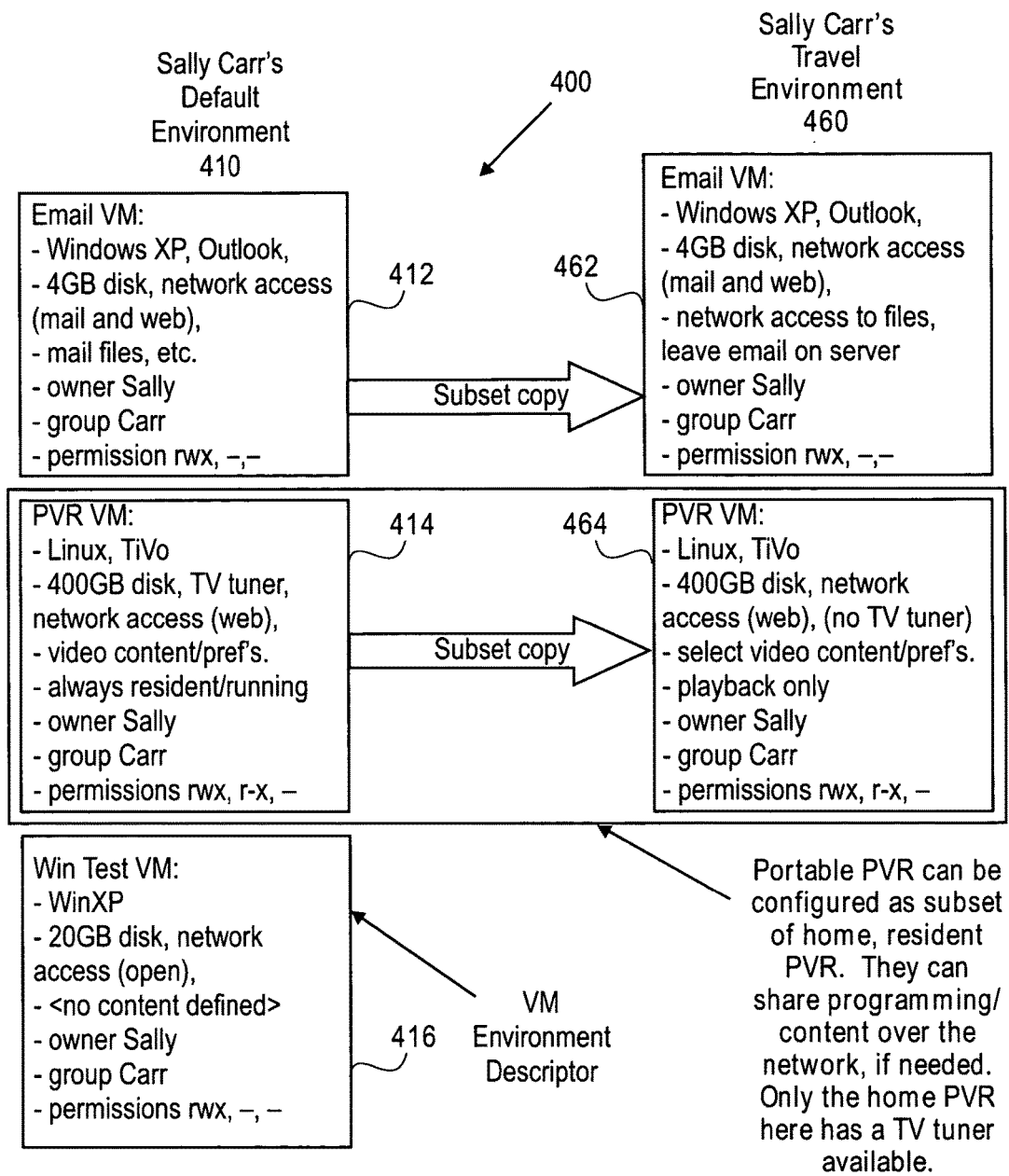
FIG. 4 illustrates a default host environment and a travel host environment for a user.
Figure 4:
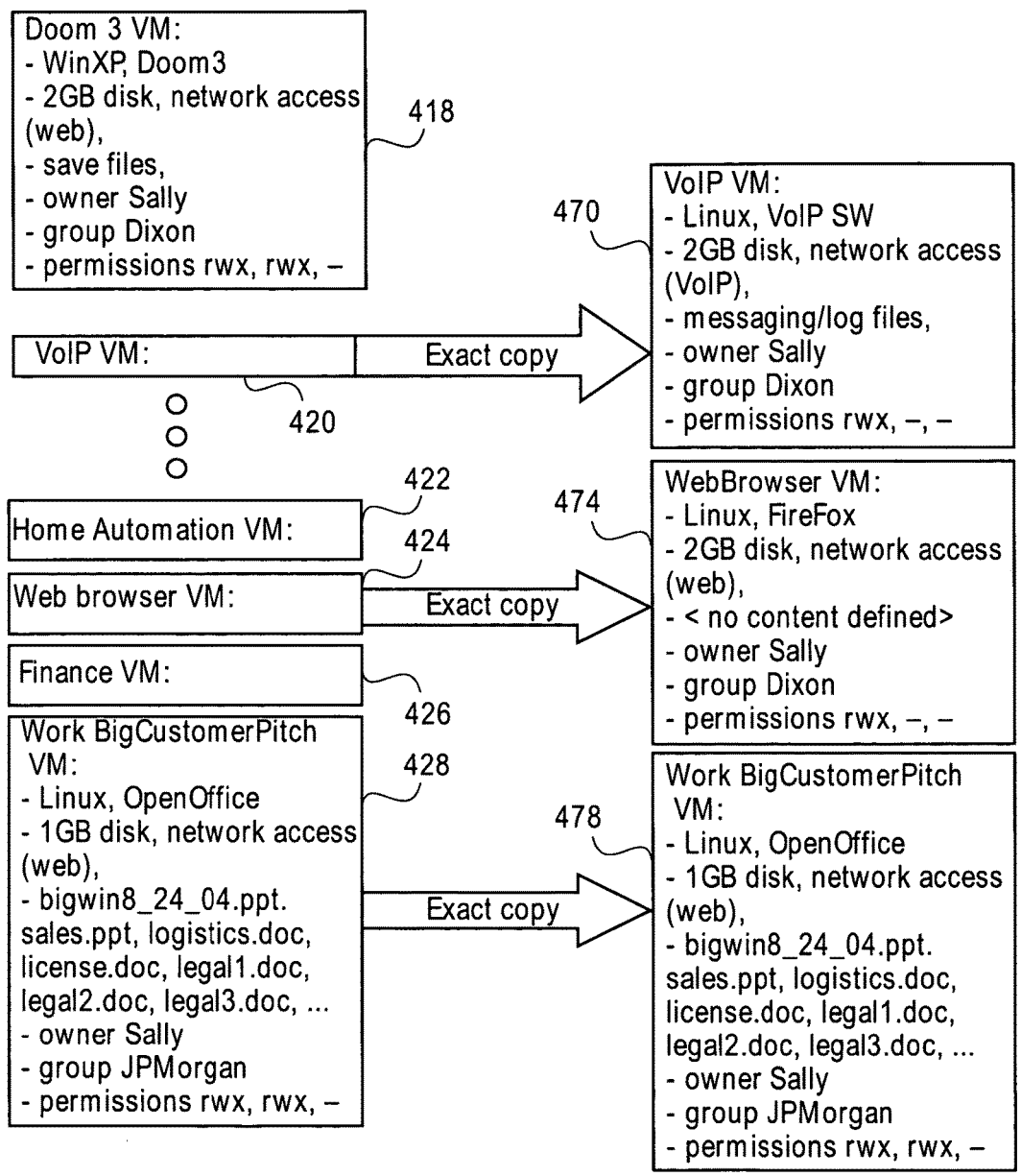

For instance, FIG. 4 illustrates a default host environment and a travel host environment for a user. FIG. 4 shows environment 400 including showing VM environment descriptors and a VM environment in each host environment for a default host environment and a travel host environment for user Sally Carr. Environment 400 includes Sally Carr's default environment 410 and Sally Carr's travel environment 460. Default environment 410 includes VM descriptors 412, 414, 416, 418, 420, 422, 424, 426 and 428. Travel environment 460 includes VM descriptors 462, 464, 470, 474 and 478. As shown in FIG. 4, descriptor 462 is a modified version of descriptor 412, such as a copy of descriptor 412, but including more, less, and/or different description and/or management information than descriptor 412. In the default environment 410, the VEM will make sure that a VM matching descriptor 414 is instantiated as it is always resident and running. Other VMs may be instantiated or suspended or created or destroyed as needed. These VMs are described by these descriptors.

Thus, descriptor 462 may be used to create and manage a VM environment on travel host environment 460 that disallows the downloading of e-mail into this travel host VM environment, so the user may not inadvertently leave any e-mail on the travel host (e.g., in case this host is accessed, lost, or stolen at a public or non-secure location). A modified version of a descriptor may include all or a part of another descriptor sent or imported from another host, user, vendor, etc. Also, a modified version of a descriptor may include a copy of another descriptor, made when a user wants to clone aspects of another configuration as a "frame" (e.g., a copied frame descriptor) and then fill in other details (e.g., other information added to the frame descriptor to create the modified descriptor). This might particularly be true if, in the modified version, the user wants to add or remove from the original VM environment (e.g., the VM environment created and managed according to the frame descriptor) special limitations/limiters put in place (e.g., disallows the downloading of e-mail as noted above, protections or resources allocations such as shown in descriptors of FIG. 4, and/or access denial of FIGS. 6A and 6B). Thus a modified version may provide variations within the confines of a "frame" or skeletal set of capabilities/configuration (e.g., of a frame descriptor). According to embodiments, an approach would be variations of the frames themselves. In some cases, a user might change fundamental elements (e.g. number of processors described in a descriptor for creating a VM). Other examples of modified versions of VM environment descriptors are contemplated, such as to subsequently alter any of the types of description and/or management information, including the types of information shown in FIG. 4.

Similarly, VMM descriptor 464 may be used to instantiate or create a VM according that has more, less, or different description information and/or management information than the descriptor 414, which is used to instantiate, create and/or manage a PVR VM. For example, descriptors 414 and 464 may be for a personal video recorder (PVR), wherein travel environment 460, a portable PVR is configured as a subset or modified version of default environment 410's PVR (such as where environment 414 is a home or resident PVR). Thus, environments created from descriptors 414 and 464, respectively, can share programming/content over a network, or the Internet, if needed. Moreover, in such an example, it is possible that only the home PVR has a television (TV) tuner available.

Descriptor 470 may be an exact copy of descriptor 420, such as by having the same amount and same description information and management information as descriptor 420. Likewise, descriptor 474 may be an exact copy of descriptor 424; and descriptor 478 may be an exact copy of descriptor 428. Travel environment 460 does not include a descriptor derived from, corresponding to, or including information from descriptor 422 or 426.

Figure 5:
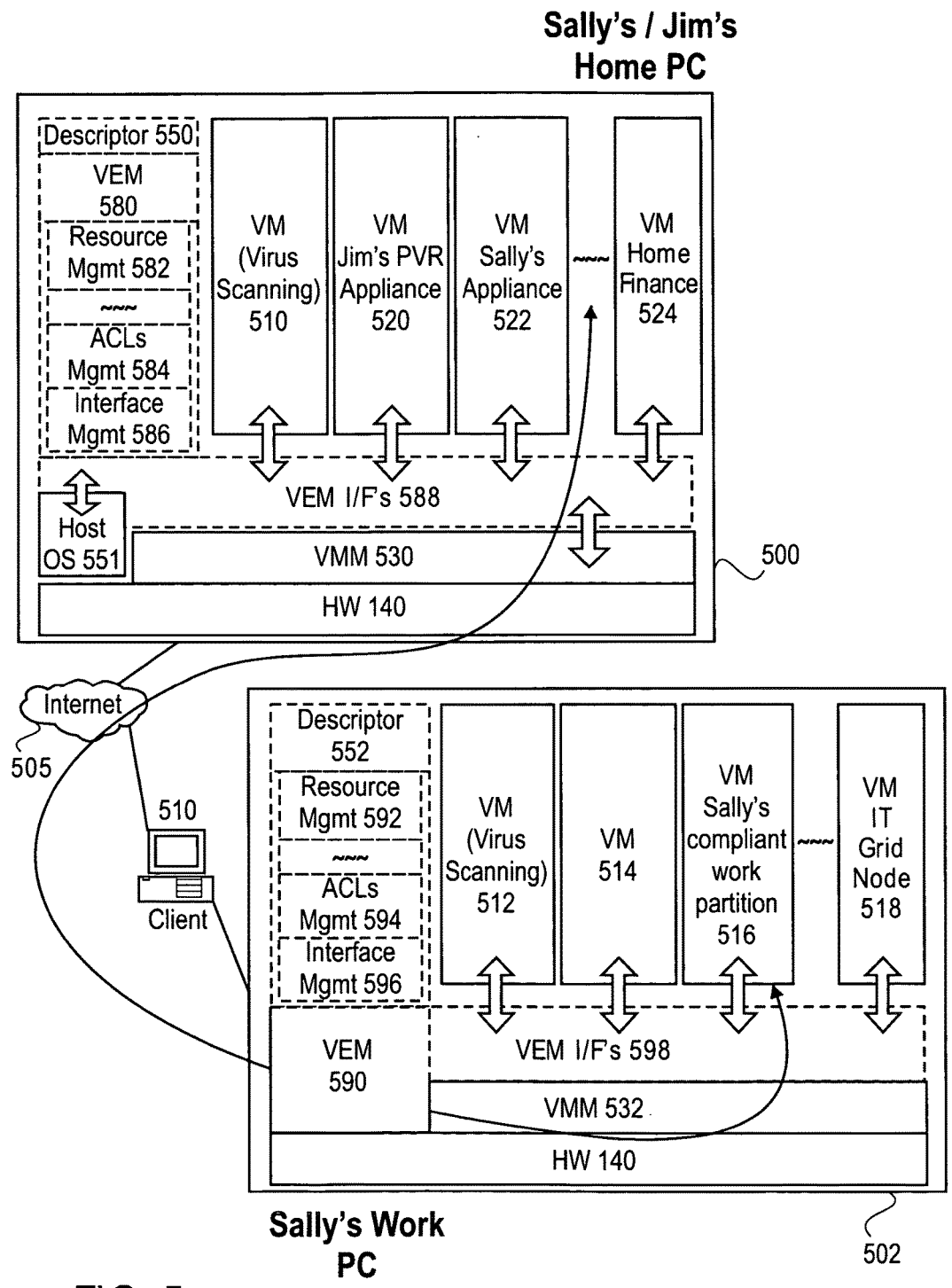
FIG. 5 illustrates VM environments and host environments running on hosts.

VEM modules also can communicate with other VEM modules on other physical hosts. The VEM can be used by a single user with one or more machines as well as between or across different users or groups of users. For instance, FIG. 5 illustrates VM environments and host environments running on hosts. FIG. 5 shows host 500 (Sally/Jim's home PC) including VMs 510, 520, 522, 524, and VEM 580 running on VMM 530. Host 500 includes VEM 580 as a VM or a VM environment. These VMs are merely illustrative, as host 500 may include more or fewer VMs (e.g., see description above with respect to FIG. 1). In addition, any of VMs 510, 520, 522, or 524 may be a VM as described above with respect to VM 110. Similarly, VMM 530 may be a VMM as described above for VMM 130 of FIG. 1.

FIG. 5 also shows VEM 580 including various behavior modules, such as resource management 582, access control list (ACLs) management 584, interface management 586, and VEM interfaces (I/F's) 588 and host OS 551. These behavior modules are merely illustrative, as VEM 580 may include more or fewer behavior modules to perform behaviors as described herein (e.g., see description below). For instance, host 500 includes VEM 580 interfacing or linking VMM 530, resource management 582, ACLs management 584, interface management 586, VMs 510, 520, 522, and 524. More particularly, VEM 580 includes VEM I/F's 588 interfacing or linking VMs 510, 520, 522, and 524 to VMM 530.

VEM 580 references or otherwise accesses descriptors 550, which are descriptors at host 500. Descriptors 550 may include descriptors, such as descriptors 250, or descriptors as otherwise described herein. VEM 580 is running in a VM on VMM 530 and/or as a VM on host 500 (e.g., see FIG. 1). VEM 580 may be a VEM as described above with respect to VEM 280 of FIG. 1. Similarly, OS 551 may be an OS such as guest OS 151 of FIG. 1.

FIG. 5 also shows host 502 (Sally's work PC) including VMs 512, 514, 516, and 518 running on VMM 532. These VMs are illustrative and may be as described above with respect to VM 510 of host 500. VMM 532 may be an enhanced VM as described above with respect to enhanced VMM 230 of FIG. 2. Host 502 includes VEM 590 as part of VMM 532.

Specifically, FIG. 5 also shows VEM 590 including various behavior modules, such as resource management 592, access control list (ACLs) management 594, interface management 596, and VEM interfaces (I/F's) 598. These behavior modules are merely illustrative, as VEM 590 may include more or less behavior modules to perform behaviors as described herein (e.g., see description below). For instance, host 502 includes VEM 590 interfacing or linking VMM 532, resource management 592, ACLs management 594, interface management 596, VM 512, VM 514, VM 516, and VM 518. More particularly, VEM 590 includes VEM I/F's 598 interfacing or linking VMs 512, 514, 516, and 518 to VMM 532.

VEM 590 references or otherwise accesses descriptors 552, such as descriptors at host 502. Descriptors 552 may include descriptors, such as descriptors 250, or descriptors as otherwise described herein. VEM 590 is running as part of VMM 532 on host 502 (e.g., see FIG. 2). VEM 590 may be a VEM as described above with respect to VEM 290 of FIG. 2. VEM 590 is shown having resource management 592, ACLs management 594, and interface management 596.

FIG. 5 shows internet 505 interfacing or linking host 500, client 510 and host 502. Note that although host 502 is shown as hosted on client 510, host 500 and/or 502 may be hosted on various computing devices as described with respect to host 100 of FIG. 1.

Thus, embodiments of the invention allow for management (e.g., creation of VM environments and/or management of VM environments) on host 500 and 502 from either or both host 500 and 502. For example, FIG. 5 shows VM 516, Sally's IT-compliant work partition that may be created on, sent to, or managed on host 502. However, the descriptor and VEM that created VM 516 may be on either host 500 or host 502. For example, the IT department that administers Sally's work PC may create the descriptor for VM 516 at host 502. The IT department can make the descriptor for VM 516 available to Sally. Sally can then send or distribute the descriptor through a network (e.g., internet 505), on a disk, on a portable memory device, etc., to host 500. Upon receiving the descriptor (e.g., referencing the descriptor) VEM 580 accesses the data files described in the descriptor and sends the descriptor and data files to VMM 530 which creates an Sally's Work IT-compliant VM environment "clone" of VM 516 according to the descriptor, call it VM 516h (not shown), but this VM is on Sally's/Jim's Home PC. Permissions are established so that only Sally can access this new VM. VMM 530 then executes VM environment 516h on host 500, and may manage VM environment 516h according to the descriptor received from host 502.

Also, according to embodiments, the VEM can perform various behaviors, including creating, monitoring, communicating, managing, updating, transmitting, importing, sending, distributing, abstracting, authenticating, and other tasks with (e.g., to, for, associated with, according to, between, across, or over) VM environment descriptors and VM environments, such as, but not limited to the following (e.g., the following behaviors):

Ability to create, destroy, copy, modify, VM environment descriptors (e.g., descriptors shown in FIGS. 2,4, and 5) and VM environments (e.g., VM environments shown in FIGS. 1-6), including associated attributes and/or metadata (e.g., attributes and/or metadata of descriptors and VM environments as shown in FIG. 4).

Ability to create, destroy, copy, modify, sets of VM environment descriptors and/or sets of VM environments, including associated attributes/metadata (e.g., such as a set of or for a host).

Ability to send, distribute, and/or designate VM environment descriptors, VM environments, and sets of VM environment descriptors/VM environments to other VEMs including (e.g., such as sending or importing from host 500 to host 502 or vice versa).
  E.g. Send Charlie my Project X VM,
  E.g. Send John my PVR environment, but not the video content,
  Sending other such VM environment descriptors, VM environments.

Ability to encrypt/decrypt VM environment descriptors, VM environments, and sets of VM environment descriptors/VM environments (e.g., using encryption keys and/or protocols for security reasons).

Ability to create hard/soft links to VM environment descriptors, VM environments, and sets of VM environment descriptors/VM environments (e.g., a hard link directly references the desired object, a soft link typically specifies a path that requires further resolution (e.g. /users/home/rob/.pvr.vem) such as "get from Rob's home directory" to provide access to a software application). In an embodiment some links to descriptors have copy-on-modify behavior (e.g. a separate, local copy of a descriptor is made if an attempt is made to modify it.); the original descriptor copy remains unchanged. Whereas in other kinds of links, the original descriptor copy is changed by any modification.

Ability to register for change updates from a particular VEM's information (e.g., such as by subscribing to a source of data from another VM), including:
  E.g. update my IT-compliant VM with changes from IT's reference VM,
  E.g. update my Project X VM with changes from Charlie's Project X VM,
  E.g. update my Project X VM with permissions/ACL updates by the project lead,
  Other such registrations or subscriptions.

Figure 7:
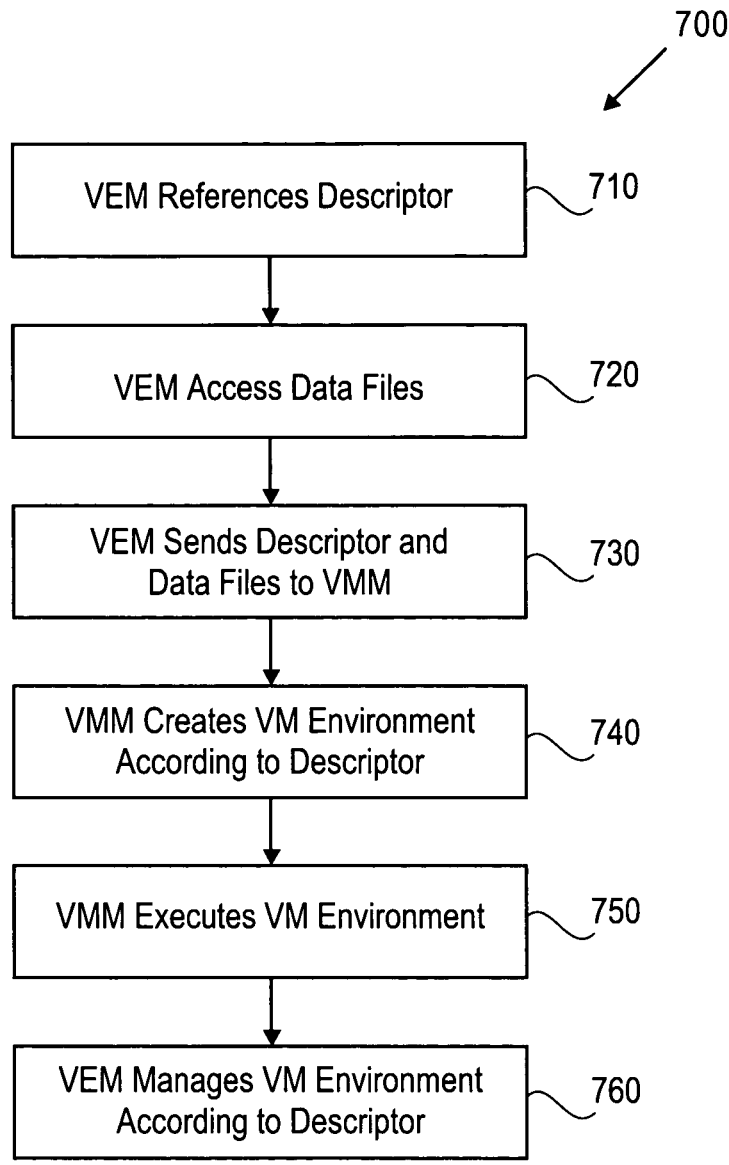
FIG. 7 is a flow chart that conceptually illustrates an example of creation and management of VM environments.

Ability to create or instantiate a VM environment from a VM environment description (e.g., see FIGS. 3 and 7).

Ability to abstract a VM environment descriptor from a VM environment (e.g., a descriptor can be derived from a VM environment, such as through appropriate abstraction of applications and data files of the VM environment).

Ability to create VM environments or VM environment descriptions from most recently used VM environments, data files, and/or applications (e.g., a user intends to travel and wants to only take work and computing context from recent activity. This permits the user to automatically identify and "bundle" up the compute environment and data files required to continue work remotely.)

Ability to substitute compatible elements and perform required translations (or best effort) (e.g., translations of description and/or management information of descriptors for creating and/or management of VM environments on different OSs) including:
  E.g. Moving information to systems that cannot instantiate certain OS or applications, but have other known substitutes,
  translating information of one descriptor into information of another descriptor that can created, executed, and/or managed a one VM environment on an operating system that is unable to created, executed, and/or manage the another VM environment according to the one descriptor, Other such substitutions and/or translations.

Register and receive automatic updates for a given VM environment. (e.g. files, permission changes, etc., such as by subscribing to a source of data from another VM) (e.g., in order to update a VM environment according to a change to another VM environment)

Ability to import and/or designate VM environment descriptors and VM environments and make appropriate permissions/ACL changes.

Single sign-on authentication of users to a VM environment or set of VM environments that may be a host environment or a user's environment.

Ability to aggregate and respond to management requests for one or more VM's (e.g., where one VEM manages VM behavior according to a request from another VEM on the same or a different host).

Thus, a specific VM environment may be similar to, copied from, created using or include information from a VM environment descriptor for another VM environment or instantiation, except the specific VM environment has a constrained or extended facet on any of the above behaviors. Similarly, a specific VM environment may have more than one constrained facet and/or extended facet on any of the above behaviors, as compared to another VM environment or instantiation.

Figure 6A:
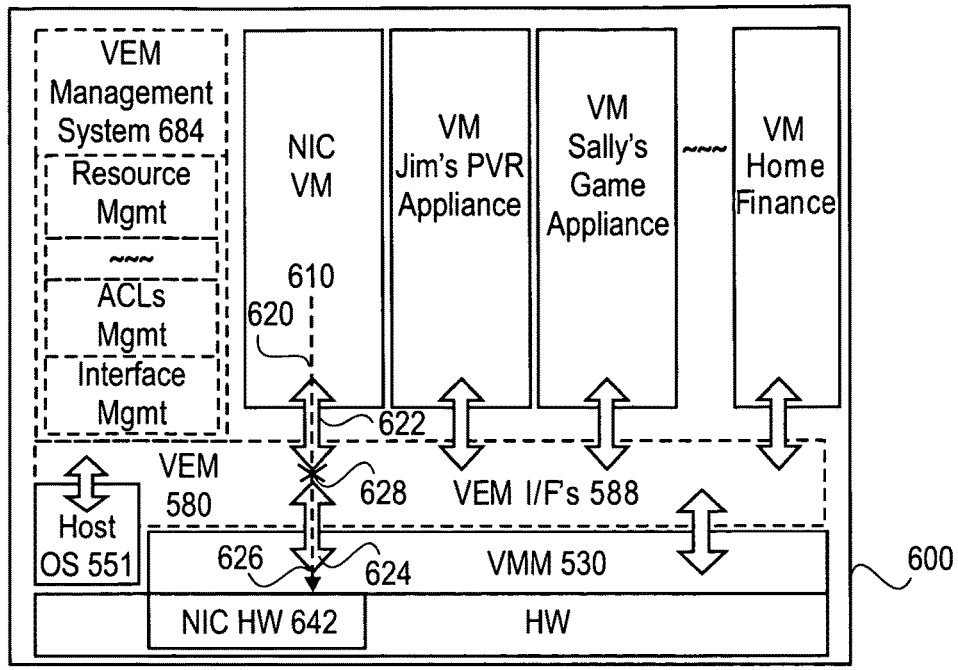
FIG. 6A illustrates VEM denial of access to a resource for a VEM as a VM.

Moreover, VEM 580 may include an instantiation system and a management system. Likewise, VEM 590 may include an instantiation system and a management system. For example, FIG. 6A illustrates VEM denial of access to a resource for a VEM as a VM. In one embodiment the denial of service is implicitly made through configuration of the VM and VMM as per the VM environment descriptor; that is, the VMM enforces the resource use. However, in an embodiment, the VEM can also play a more active role. FIG. 6A shows host 600 including VEM management system 684 as part of VEM 580, network interface card (NIC) VM 610, and NIC hardware (HW) 642 (as part of hardware 140). Host 600 may be a host as described above with respect to host 500, except that host 600 shows VEM management system 684, includes NIC VM 610 instead of VM 510 and must include NIC hardware 642.

FIG. 6A shows VEM 580 denying or stopping VM access request 620 to NIC HW 642 from reaching NIC HW 642. Specifically, request 620 is transferred to VEM I/F's 588 along choke point 622. As noted, such choke points may be points through which all input/output (I/O) to and from a VEM and a VM or a VMM typically traverse. Thus, the choke points may be used by VEMs to perform behaviors, managing, monitoring and/or filtering of data, data communications, access, behavior, etc. Specifically, for instance, upon receiving request 620, VEM management system 684, denies, stops, or otherwise refuses request 620 to be sent to NIC HW 642, such as according to management information in a descriptor used to create and/or manage NIC VM 610. Specifically, FIG. 6A shows denied access request 626 where request 620 would have been sent, had it been allowed to cross choke point 624. However, instead, request 620 is stopped at point 628 by VEM management system 684.

Figure 6B:
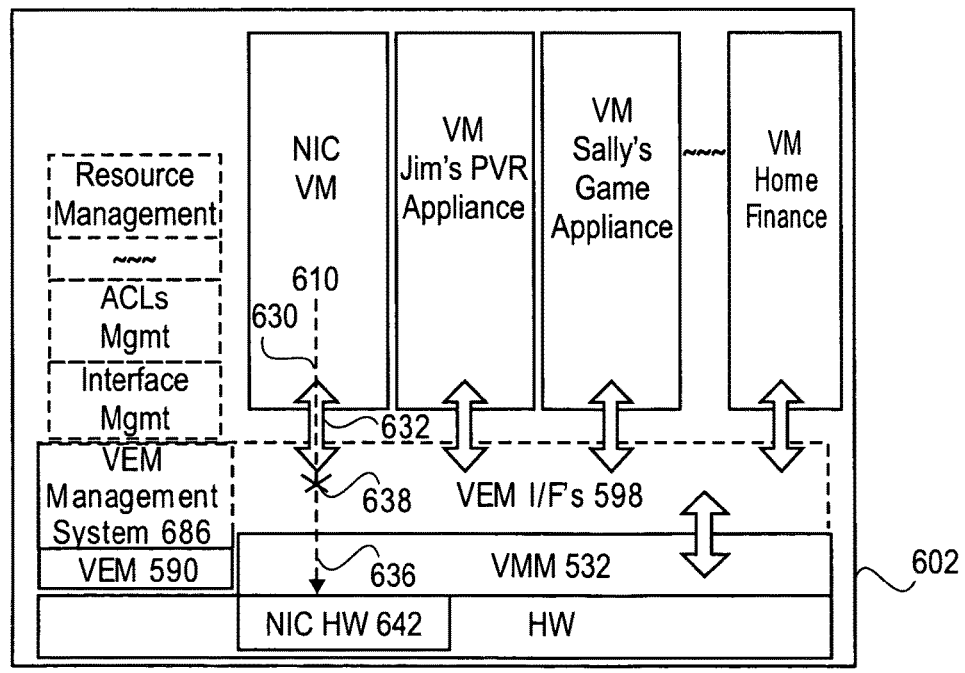
FIG. 6B illustrates VEM denial of access to a resource for a VEM as part of a VMM.

FIG. 6B illustrates VEM denial of access to a resource for a VEM as part of a VMM. FIG. 6B shows host 602 including VEM management system 686 of VEM 590, NIC VM 610, and NIC HW 642. Similar to the description above with respect to FIG. 6A, host 602 may be similar to host 502, except for host 602 shows VEM management system 686, includes NIC VM 610 instead of VM 512, and includes NIC HW 642 as part of HW 140.

Similarly, FIG. 6B shows VEM management system 686 denying VM access request 630 of NIC VM 610 from reaching NIC HW 642. Although request 630 transacts through choke point 632, to VEM I/F's 598, it is stopped at point 638, and not allowed to pass through NIC HW 642, as shown by denied access request 636. Note that in the case of VEM management system 686, it is not necessary that a choke point exist between interfaces 598 and VMM 532 as VEM 590 (and hence VEM management system 686) is part of VMM 532.

Moreover, according to embodiments, some or all of the management system (e.g., management of a VM environment, such as controlled by a VEM and according to management information of a descriptor) could run in an application or device driver on the Host OS, be part of the host OS itself, and/or be run in a separate (distinguished/special) VM. For example, FIG. 6A shows Host OS 551, such as a "service OS", on which VEM management system 684 is running.

For instance, a service OS may be a host OS that permits the management system to run and request actions of the Host OS for controlling the platform to permit access or not to various resources, etc. (e.g., see denial of NIC HW access above). In some cases, a service OS (e.g., OS 551) also makes it possible for any management components (e.g., a driver, and/or a component of management system 684 and/or VEM 580) running in the Host OS environment to "talk" to the other elements of the management system interface (e.g., I/F's 588) or of the VMM (e.g., VMM 530).

In some cases, the VEM Management system 684 may "trampoline" through the VMM 530 to talk to the management system interfaces (VEM I/F's 588). For instance this might be required if VEM I/F's 588 was integrated as part of VMM 532, but other VEM 684 management functionality were hosted by the OS 551. In other cases, for example, the VEM Management system 686 may talk to it directly) to VEM I/F's 598. For instance, FIG. 6B shows an implementation where management system interface, I/F's 598 are part of VMM 532. Here, the VEM Management system 686 which is also part of VMM 532 may talk directly to I/F's 598, such as to manage VM environments of host 602.

FIG. 7 is a flow chart that conceptually illustrates an example of creation and management of VM environments. FIG. 7 shows process 700, which may or may not be a process for creating, running, executing, resuming, and/or managing VM environments, such as for a VM host, as described above with respect to FIGS. 1-6.

Creating a VM environment may describe where FIG. 7 refers to executing an environment not executed by the host since the current OS boot up. Resuming a VM environment may describe where FIG. 7 refers to executing an environment that has been previously executed by the host since the current OS boot up. Thus, to start up (e.g., execute) a VM that has already been created before, a VM can be executed (resumed) according to the information for a descriptor for the previously created VM (e.g., a descriptor having updated information describing the executed VM).

Process 700 includes block 710 at which a VEM references a descriptor. For instance, referring to FIG. 5, a descriptor from either host 500 and 502 may be referenced. Also, in some embodiments such a descriptor may be created by referencing multiple descriptors either or both host 500 and 502. Specifically, the descriptor above for Sally's IT-compliant work partition, VM 516, may be referenced by VEM 580 of host 500 from a descriptor at VEM 590 of host 502 to create a VM environment at host 500 based on or similar to VM 516 (e.g., so Sally can do some work at home on the home PC). This referencing may be described as importing the descriptor, such as where the descriptor (or information for creating the descriptor to be referenced by VEM 580) is "pulled" or accessed by or to host 500 (e.g., VEM 580) from host 502 (e.g., VEM 590 or descriptors at VEM 590). Alternatively, this referencing may be described as sending the descriptor, such as where the descriptor (or information for creating the descriptor to be referenced by VEM 580) is "pushed" or transmitted to host 500 (e.g., VEM 580) from or by host 502 (e.g., VEM 590 or descriptors at VEM 590). Note that the descriptions above for block 710 describe a descriptor pushed or pulled to host 500, which is different than the description above for FIG. 5, where a user (Sally) creates the descriptor for VM 516 at host 500, and then sends or pushes the descriptor through a network to host 502.

At block 720, upon or after referencing the descriptor, a VEM accesses the data files described in, corresponding to, or identified by the descriptor. In some cases, the VEM in blocks 710 and 720 is the same VEM, or is a VEM on the same host. For instance, referring to FIG. 5, VEM 580 may reference a descriptor and accesses the data files corresponding to that descriptor for creating VM 516. The descriptor may have description information for creating one or more VM environments and/or management information for managing one or more VM environments.

At block 730, upon or after accessing the data files, a VEM sends or provides the descriptor (or translated actions dictated by the descriptor) and the corresponding data files to a VMM. It is also considered that at block 730, upon or after accessing the data files, a VEM sends or provides substituted and/or translated actions dictated by the descriptor and the corresponding data files to a VMM. The substituted and/or translated actions may be sent in cases where the VMM may not be capable of understanding the descriptor (e.g., because that VMM is not able to instantiate an OS or application required for an action of the descriptor). In this case, the VEM may automatically substitute a translated action dictated by the descriptor to the VMM, the translated action for an OS or application an action of the descriptor that the VMM is not able to instantiate. Therefore, the VEM may need to send commands, etc. to the VMM in the VMM's own parlance to carry out what the descriptor describes.

In some cases, the VEM in blocks 710, 720 and/or 730 may be the same or different VEMs, or VEMs on the same or different host. Likewise, in some cases, the VMM in block 730 may be on the same or a different host than the VEM of blocks 710, 720 and/or 730. For instance, referring to FIG. 5, VEM 580 may send the descriptor (or actions directing the VMM) and corresponding data files to VMM 530 or VMM 532 to create VM 516 according to the descriptor.

At block 740, upon or after receiving a descriptor (or descriptor-derived actions) and the corresponding data files, a VMM creates a VM environment according to the descriptor, such as using the data files associated with the descriptor. In some cases, the VMM in blocks 730 and 740 is the same VMM, or is a VMM on the same host. For instance, referring to FIG. 5, VMM 530 and/or VMM 532 may create VM 516 according to the descriptor and using the data files associated with the descriptor. According to embodiments, if VMM 530 creates VM 516 on host 502, then VMM 530 creates VM 516 on host 500 (e.g., VM 516h as described). Alternatively, in some cases, if VMM 532 creates VM 516 on host 502, then VMM 532 creates VM 516 on host 500. In some cases, instead of instantiating a new VM, the VMM will simply locate and restore a suspended VM meeting the descriptor criteria.

At block 750, upon or after creating a VM environment, the VMM executes the VM environment created. In some cases, the VMM in blocks 740 and 750 is the same VMM, or is a VMM on the same host. For instance, referring to FIG. 5, VMM 530 or VMM 532 may create and execute VM 516 according to the descriptor and using the data files associated with the descriptor. According to embodiments, if VMM 530 creates VM 516, then VMM 530 creates and executes VM 516 on host 500. In some cases, if VMM 532 creates VM 516, then VMM 532 creates and executes VM 516 on host 502.

Also, block 740 and/or 750 may be described as resuming a VM environment. Thus, block 740 may be omitted (e.g., optional and not performed for this embodiment) and block 750 may include executing (e.g,. resuming) a VM that has already been created (e.g., before block 740) according to the information for a descriptor for the previously created VM. For instance, a user can resume an email VM, suspended when the host machine is turned off (e.g., by the user, thus, suspending the user's email VM). Then the VEM can unsuspend or resumed the email VM when the host is turned back on (e.g., by the user) starting the email VM that has already been created before according to the information stored in the descriptor and the data files for the suspended VM.

At block 760, upon or after a VM environment is executed (instantiated and "run" or resumed), a VEM manages the VM environment executed. VEM may management may include use of VEM I/F's and/or VMM management as noted above. In some cases, the VEM in blocks 760 and 730 may be the same or different VEMs, or VEMs on the same or different host. For instance, referring to FIG. 5, VEM 580 may send the descriptor and corresponding data files to VMM 532, which creates VM 516 at host 502 according to the description information of the descriptor. Once VM 516 is created at host 502, VEM 590 may manage VM 516 at host 502 according to the management information of the descriptor. According to embodiments, if VMM 530 executes VM 516, then VEM 580 manages VM 516 on host 500. In some cases, if VMM 532 executes VM 516, then VEM 590 manages VM 516 on host 502.

As noted above, process 700 may be performed by the same VEM that creates or generates the descriptor to create (or resume) the VM environment and/or the same VM that creates or generates the descriptor to manage the VM environment. Alternatively, the description information to create the VM environment and/or management information to manage the VM environment may be obtained, acquired, or referenced from another VEM, such as by accessing a storage device, network, the internet, a memory, etc. It can be appreciated that the ability for different VEMs and VMMs to use or reference descriptors from various hosts and/or other VEMs to create and/or manage VM environments provides flexibility for creating VM environments. Thus, embodiments of the invention allow for flexible and uncomplicated virtual environment "manager" (VEM) creation of VM environments and/or management of VM environments on one or more hosts and according to descriptor information referenced, created, or otherwise obtained from one or more hosts. Note that although a VEM is described as a "manager", as noted herein, a VEM performs behaviors, functions, processes, creations, resumptions, suspensions, etc., in addition to management of VM environments.

Further, in some cases, a user may interface, access, provide input, obtain output, and/or communicate with a VEM and/or descriptor using a user interface (e.g., input/output or I/O to the VEM). A user interface may be part of hardware 140, such as including a monitor, screen, keyboard, mouse, and/or audio equipment, etc. Also, examples of a user input may include a "unification console" and/or typical I/Os for VMM environments.

Embodiments of the present descriptors, VEMs, and/or VM environments can work alone or synergistically with a "unification console", such as a console (e.g., where "console" may describe a method, apparatus and/or system) that provides for transparently unifying multiple VMs (e.g., here and in descriptions below, a "VM" may represent a VM environment or a VEM) on a host. More specifically, a unification console on a host may be dedicated to providing a user with a unified view of multiple VMs on the host, regardless of the application the user is running or VM in which the application is running. In one embodiment the unification console could itself be a VM or a VM environment.

For instance, a unification console may allow for user interaction with applications, which are running in one or more VMs (other than the unification console itself). The unification console and the VMM (and/or VEM) allow for the redirection of the output of the application to appear on the display of the unification console. Correspondingly the unification console can take user input designated for the application and route and deliver it via the VMM (or a direct inter-VM communication mechanism). The user interface is unified in the sense that the user may be aware of logical partitioning of resources or domains of operation, but they are not directly aware of the use of virtual machines for securely isolating those resources or domains.

Figure 8:
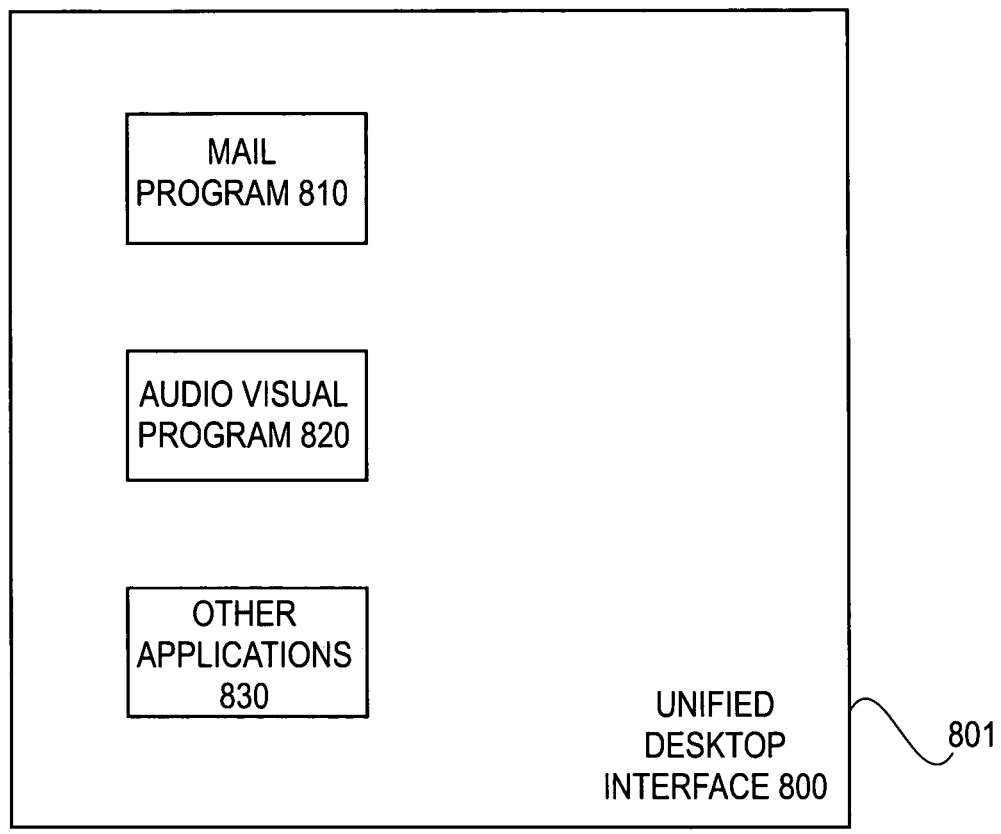
FIG. 8 illustrates an example of a unified user interface on the desktop of the VM host according to an embodiment of the present invention.

Using such a unification console, users may interact with Guest Software on a VM host via a unified graphical user interface (the user interface hereafter referred to as "Unified Desktop Interface 800"). As illustrated in FIG. 8, the user may be presented with Unified Desktop Interface 800, which is a logical representation of the views of all or a subset of the various VMs on Host 100 such that the user can see and/or launch applications in one or more VMs from this view. In various embodiments, the view presented to the user may resemble a typical desktop, but unknown to the user, the desktop may in fact represent applications contained in various VMs on the host. In one embodiment, the user's view of Unified Desktop Interface 800 may include all applications available to the user. Thus, for example, if the user has access to all the VMs on Host 801 (e.g. host 801 may be a host such as host 100, 200, 500, 502, 600, 602, etc. as described herein) then the various applications in each partition may be visible and accessible to the user in Unified Desktop Interface 800. Alternatively, the user may only have permission to access a subset of VMs on the host, in which case the applications visible and accessible to the user may include only those contained in the authorized VMs. As illustrated, Mail Program 810, Audio Visual Program 820 and various other applications (shown collectively as "Other Applications 830") are presented to the user in this interface without any indication of which VM these applications reside in. In fact, from the user's perspective, there may appear to be little to no difference between a non-virtualized environment and the virtualized environment of Host 801 (in which each application is contained in its own VM).

Unified Desktop Interface 800 illustrated in FIG. 8 is merely an example of an interface that the user may see, in which there is no indication that the host is virtualized. In an alternate embodiment, Unified Desktop Interface 800 may include a view of all the VMs as well as all the applications running in each VM. In yet another embodiment, in a layered VM environment, a unified desktop interface may exist across some or all VM layers. Alternatively, in a layered VM environment, a unified desktop interface may be provided with each VMM, thus enabling one unified desktop interface to be embedded in the unified desktop environment of a parent VM layer. Hybrids of layering of unified desktops and/or interleaving of unified desktops are permitted.

Figure 9:
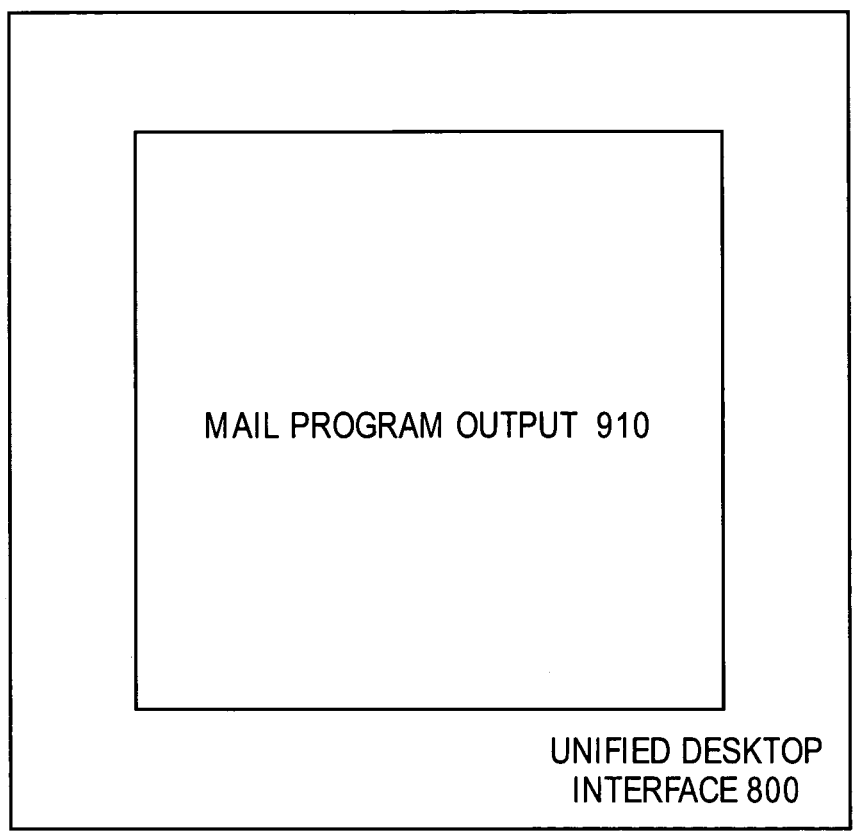
FIG. 9 illustrates the output from an application running in a VM, as displayed on the unified user interface on the desktop on the VM host according to an embodiment of the present invention.

Various other unified desktop interfaces may be implemented without departing from the spirit of embodiments of the present invention. Most importantly, by presenting a unified view to the user, embodiments of the present invention significantly improve the usability of multiple VMs simultaneously, because the user's experience may resemble that of a typical desktop PC user, namely one in which the user simply selects an application (i.e., Guest Software) on Host 801 to execute, without needing to be aware of the virtual partitions on the PC and/or how to manage or exchange the Guest Software files within these partitions. Thus, for example, if the user selects Mail Program 810, as expected, the user may then be presented with the graphical output ("Mail Program Output 910") from Mail Program 810, as illustrated in FIG. 9. The user may view this output within Unified Desktop Interface 800 and the underlying interaction with the various VMs on Host 801 may remain invisible to the user, i.e., the user does not know that Mail Program 810 is actually executing in one of the VMs on Host 801.

Although invisible to the user, various elements on Host 801 enable the user to view and/or interact with all the VMs on Host 801 via Unified Desktop Interface 800. More specifically, in various embodiments of the present invention, a "unification console" (described in further detail below) enables the unified interface by transparently redirecting the input and/or output from the user and the VMs such that the user does not have to know which VM an application resides in and/or is running in. For the purposes of this specification, input and/or output shall include any form of input and/or output that Host 801 may recognize. Thus, although "input" herein implies that it is a keystroke, a mouse click or mouse movement provided by the user, it may in fact include any other input design that Host 801 is capable of receiving. Similarly, although "output" is described herein as primarily being visual output, embodiments of the present invention are not so limited. Output may therefore include other types of output, such as audio output.

Figure 10:
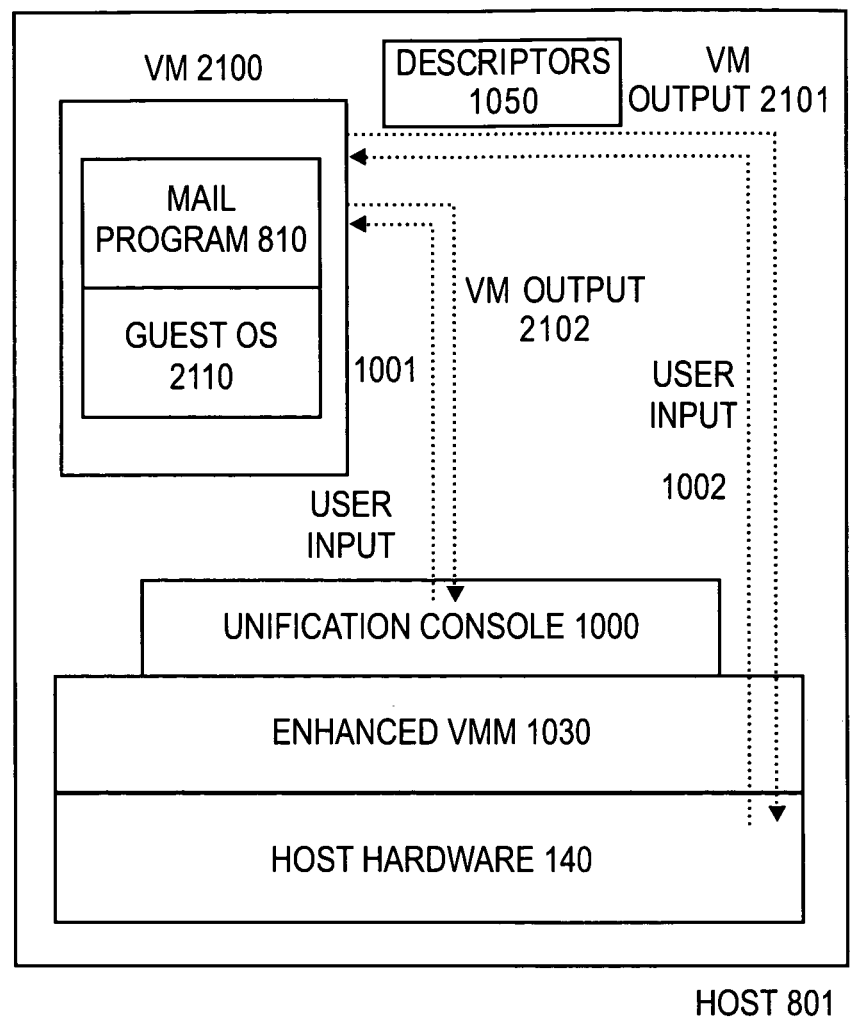
FIG. 10 illustrates a unification console input and output interactions according to an embodiment of the present invention.

In one embodiment, a dedicated VM on Host 801 may be designated to run the unification console with access to all the VMs on Host 801. FIG. 10 illustrates conceptually how the unification console ("Unification Console 1000") functions to present Unified Desktop Interface 800 to the user. Host 801 includes VM 2100 having guest OS 2110, and descriptors 1050. VM 2100 and/or guest OS 2110 may be a VM and/or guest OS as described above for VM 110 and/or guest OS 151 of FIG. 1. Also, descriptors 1050 may be a descriptors as described above for descriptors 250, 550 and 552)

In FIG. 10 Unification Console 1000 is illustrated as a separate component from the VMM ("Enhanced VMM 1030," which may be an enhanced VMM such as enhanced VMM 230 of FIG. 2, which includes a VEM running on that VMM). In some cases, Unification Console 1000 may be a specially privileged VM running on a VMM. However, embodiments of the invention are not so limited. Instead, in one embodiment, Enhanced VMM 1030 may include all the functionality of Unification Console 1000 while in an alternate embodiment, Unification Console 1000 may be a component that works in conjunction with Enhanced VMM 1030 (e.g., in an embodiment, Unification Console 1000 may comprise an enhanced VM capable of accessing all the other VMs on Host 801). In various embodiments, input and/or output from the user and/or the VMs (e.g., VM 2100 or other VMs not shown) may be received by Enhanced VMM 1030 and passed on to Unification Console 1000 for processing. For instance, user input 1001 may be received by VM 2100 from unification console 1000, and user input 1002 may be received by VM 2100 from hardware 140. Also, VM output 2102 may be received by unification console 1000 from VM 2100, and VM output 2101 may be received by hardware 140 from VM 2100. It will be readily apparent to those of ordinary skill in the art that Unification Console 1000, hosts, descriptors, VM environments, and VEMs, as described herein may be implemented in software, hardware, firmware and/or any combination thereof. Additionally, Enhanced VMM 1030 may include various enhancements over existing VMMs, either to include the functionality of Unification Console 1000 and/or to interact with Unification Console 1000. It will be readily apparent to those of ordinary skill in the art that Enhanced VMM 1030 may also be implemented in software (e.g., as a standalone program and/or a component of a host operating system), hardware, firmware and/or any combination thereof.

Conventional virtual machine usages and architectures encourage and preserve the separation and isolation features offered by VMs. These features are very useful in data center operations (e.g. servers, workstations, and mainframes). However, for the desktop PC and home PC, this usage model may prove difficult because end users are likely to be confused by the VM concept and to misunderstand separate (isolated) creation/usage/management methodology. Embodiments of the descriptors, VEMs, VM environments, and/or unification console offer the benefits of VM technology in a more user-transparent manner.

Embodiments of the descriptors, VEMs, VM environments, and/or unification console provide a method for creating and managing collections of disparate VMs to present a more monolithic environment (and therefore more comprehensible, especially to an end user) view of the underlying machine. This includes a unified, single sign-on authentication, such as to allow a user to use a unification console to access a VEM (and, therefore, a set of VMs, OSes, and applications) and to specify or select separate host environment management policies (e.g., create and or change descriptor information, data file information, constrained facet information and/or extended facet information) for a VM, a user, a host, a home desktop computer, a laptop computer, and/or a work computer.

Embodiments of the descriptors, VEMs, VM environments, and/or unification console permit end users or IT to administer, distribute and share (or designate) of collections of VM environment descriptors and/or VM environments, or descriptions of those collections. This facilitates collaborative computing uses as well.

Embodiments of the descriptors, VEMs, VM environments, and/or unification console address the issue that end users may be confused by the VM concept and separate (isolated) usage/management methodology. Consider a home PC used by a family or a desktop PC in the enterprise. Each family member/user may have one or more virtual machines with their customized environments, there may be gaming VM, Personal Video Recorder appliance VMs, enterprise IT-supplied VMs for telecommuting, etc. Creating and/or managing and orchestrating the movement of virtual machines, files, access permissions, and usages may be overwhelming for the average user.

Embodiments of the descriptors, VEMs, VM environments, and/or unification console may increase the adoption rate of service platforms and grid computing on the desktop, both in the enterprise and in the home, because the complexity of these partitions can be hidden or exposed as needed. Software stacks can be bundled into stable distribution units or images (e.g., into stable descriptors, VM environments, and/or host environments). Using this kind of technology, the stable distribution units can be pushable or pullable as a more centralized and limited bundled of software than without the console, descriptors, and/or VEMs. IT departments then, for example, can push these out to their corporate users both at the office and for home use as well. Stable contours or collections can, for instance, be determined through both purposeful construction and/or experimentation. Because these VM image units execute in isolated partitions, the barrier for adoption of massive grid computing and the distribution of service-oriented VM images could be lowered and become ubiquitous. The management partition (e.g., a VEM) plays the matchmaker, but also can have additional policies (e.g., management policies) that ensure proper load balancing and enforcement of local autonomy.

The hosts, descriptors, VM environments, and VEMs, according to embodiments of the present invention may be implemented on a variety of computing devices, such as where host 100, 200, 500, 502, 600, 602, 801 and/or another host is a PC or is a computer server (e.g., a server to service one or more client computers). According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium includes any mechanism that stores and/or transmits information in any form accessible by a computing device, the machine-accessible medium including but not limited to, recordable/non-recordable media (such as read-only memory (ROM), random-access memory (RAM), magnetic disk storage media, optical storage media and flash memory devices), as well as mechanical, electrical, optical, acoustical or other form of propagated signals (such as carrier waves, infrared signals and digital signals).

According to an embodiment, a computing device may include various other well-known components such as one or more processors. Thus, the computing device (e.g., a host, descriptors, VM environments, and VEMs,) may include any type of processor capable of executing software, including microprocessors, multi-threaded processors, multi-core processors, digital signal processors, co-processors, reconfigurable processors, microcontrollers and/or any combination thereof. The processors may be arranged in various configurations such as symmetric multi-processors (e.g., 2-way, 4-way, 8-way, etc.) and/or in other communication topologies (e.g., toroidal meshes), either now known or hereafter developed. The term "processor" may include, but is not necessarily limited to, extensible microcode, macrocode, software, programmable logic, hard coded logic, etc., capable of executing embodiments of the present invention.

The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device to provide input data. In alternate embodiments, the host bus controller may be compatible with various other interconnect standards including PCI, PCI Express, FireWire and other such current and future standards.

In the foregoing specification, embodiments of the invention have been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A data processing system comprising:
    a processor;
    a non-transitory machine accessible medium responsive to the processor; and
    instructions stored in the non-transitory machine accessible medium which, when executed, implement a virtual environment manager (VEM) operable to perform operations comprising:
        creating a first virtual machine (VM) descriptor, wherein the first VM descriptor describes aspects of an original VM to execute on a first host computer, the aspects comprising an application to execute in the original VM and at least one application configuration parameter for the application to execute in the original VM;
        creating a second VM descriptor based on the original VM, wherein the second VM descriptor describes aspects of a second VM to execute on a second host computer, the aspects comprising the application to execute in the second VM and at least one application configuration parameter for the application to execute in the second VM; and
        defining a collection of VM environments for a particular user, the collection of VM environments comprising a first VM environment with the first host computer and the original VM, and a second VM environment with the second host computer and the second VM;
    wherein the at least one application configuration parameter in the second VM descriptor differs from the at least one application configuration parameter in the first VM descriptor, wherein the difference causes at least one operation that is available for the application in the original VM to be unavailable for the application in the second VM;
    wherein the VEM is to provide a graphical user interface in which (1) visual representations associated with a plurality of applications running on the original and second VMs are to be presented, and (2) features of a guest operating system (OS) of the original and second VMs are to be hidden such that an application running on the guest OS appears to a user to be running on a desktop of the first host computer;
    wherein the graphical user interface is to permit user interaction, at least in part, with the applications associated with the visual representations, output from the applications associated with the visual representations to be redirected, at least in part, via the VEM for display via the graphical user interface, and user input for the applications associated with the visual representations to be provided, at least in part, to the applications associated with the representations via direct inter-VM communication.

2. A data processing system according to claim 1,
    wherein the collection of VM environments comprises a work environment corresponding to the first VM environment, a travel environment corresponding to the second VM environment, and a home environment corresponding to a third VM environment;
    wherein the application configuration parameters cause the application to operate differently in the travel environment, relative to the work environment.

3. A data processing system according to claim 2, wherein the application configuration parameters cause an email application in the travel environment to process email differently from the email application in the work environment.

4. A method comprising:
    using a virtual environment manager (VEM) to create a first virtual machine (VM) descriptor, wherein the first VM descriptor describes aspects of an original VM to execute on a first host computer, the aspects comprising an application to execute in the original VM and at least one application configuration parameter for the application to execute in the original VM;
    using the VEM to create a second VM descriptor based on the original VM, wherein the second VM descriptor describes aspects of a second VM to execute on a second host computer, the aspects comprising the application to execute in the second VM and at least one application configuration parameter for the application to execute in the second VM;
    using the VEM to define a collection of VM environments for a particular user, the collection of VM environments comprising a first VM environment with the first host computer and the original VM, and a second VM environment with the second host computer and the second VM; and
    using the VEM to provide a graphical user interface in which (1) visual representations associated with a plurality of applications running on the first and second VMs are to be presented, and (2) features of a guest operating system (OS) of the original and second VMs are to be hidden such that an application running on the guest OS appears to a user to be running on a desktop of the first host computer;
    wherein the at least one application configuration parameter in the second VM descriptor differs from the at least one application configuration parameter in the first VM descriptor, wherein the difference causes at least one operation that is available for the application in the original VM to be unavailable for the application in the second VM;
    wherein the graphical user interface is to permit user interaction, at least in part, with the applications associated with the visual representations, output from the applications associated with the visual representations to be redirected, at least in part, via the VEM for display via the graphical user interface, and user input for the applications associated with the visual representations to be provided, at least in part, to the applications associated with the representations via direct inter-VM communication.

5. A method according to claim 4,
wherein the collection of VM environments comprises a work environment corresponding to the first VM environment, a travel environment corresponding to the second VM environment, and a home environment corresponding to a third VM environment.

6. A method according to claim 4, further comprising:
using the VEM to specify at least one operation that is available for the original VM as not available for the second VM.

7. A method according to claim 6, further comprising:
using the VEM to specify different application configuration parameter for the application in the second VM, relative to the application configuration parameter for the application in the original VM.

8. A method according to claim 7, wherein the operation of using the VEM to specify different application configuration parameter for the application in the second VM comprises:
using the VEM to specify that an email application in the second VM is to process email differently from the email application in the original VM.

9. A method according to claim 4, wherein:
the operation of using the VEM to create the first VM descriptor comprises:
saving application data in the first VM descriptor, wherein said application data identifies the application to execute in the original VM; and
saving original application configuration data in the first VM descriptor, wherein the original application configuration data provides for a first configuration of the application in the original VM;
the operation of using the VEM to create the second VM descriptor comprises:
saving application data in the second VM descriptor, wherein said application data identifies the application to execute in the second VM; and
saving revised application configuration data in the second VM descriptor, wherein the revised application configuration data provides for a second configuration of the application in the second VM.

10. An article of manufacture comprising:
a non-transitory machine accessible medium; and
instructions stored in the non-transitory machine accessible medium which, when executed by a machine, implement a virtual environment manager (VEM) operable to perform operations comprising:
creating a first virtual machine (VM) descriptor, wherein the first VM descriptor describes aspects of an original VM to execute on a first host computer, the aspects comprising an application to execute in the original VM and at least one application configuration parameter for the application to execute in the original VM;
creating a second VM descriptor based on the original VM, wherein the second VM descriptor describes aspects of a second VM to execute on a second host computer, the aspects comprising the application to execute in the second VM and at least one application configuration parameter for the application to execute in the second VM;
defining a collection of VM environments for a particular user, the collection of VM environments comprising a first VM environment with the first host computer and the original VM, and a second VM environment with the second host computer and the second VM; and
providing, at least in part, a graphical user interface in which (1) visual representations associated with a plurality of applications running on the original and second VMs are to be presented, and (2) features of a guest operating system (OS) of the original and second VMs are to be hidden such that an application running on the guest OS appears to a user to be running on a desktop of the first host computer;
wherein the at least one application configuration parameter in the second VM descriptor differs from the at least one application configuration parameter in the first VM descriptor, wherein the difference causes at least one operation that is available for the application in the original VM to be unavailable for the application in the second VM;
wherein the graphical user interface is to permit user interaction, at least in part, with the applications associated with the visual representations, output from the applications associated with the visual representations to be redirected, at least in part, via the VEM for display via the graphical user interface, and user input for the applications associated with the visual representations to be provided, at least in part, to the applications associated with the representations via direct inter-VM communication.

11. An article of manufacture according to claim 10, wherein the operation of creating the second VM descriptor comprises specifying different application configuration parameter for the application in the second VM, relative to the application configuration parameter for the application in the original VM.

12. An article of manufacture according to claim 11, wherein the operation of specifying different application configuration parameter for the application in the second VM comprises specifying that an email application in the second VM is to process email differently from the email application in the original VM.

* * * * *